| (12) | United States Patent | (10) Patent No.: | US 8,390,933 B2 |
|---|---|---|---|
| | Tanaka et al. | (45) Date of Patent: | Mar. 5, 2013 |

(54) IMAGE DISPLAY DEVICE, HEAD-MOUNTED DISPLAY, AND LIGHT BEAM EXPANDING DEVICE

(75) Inventors: Hiroshi Tanaka, Miyagi (JP); Kazuya Hayashibe, Miyagi (JP); Masanari Yamaguchi, Kanagawa (JP); Kunihiko Saruta, Kanagawa (JP); Keita Ishikawa, Tokyo (JP); Teppei Imamura, Tokyo (JP)

(73) Assignee: Sony Corporation, Tokyo (JP)

( * ) Notice: Subject to any disclaimer, the term of this patent is extended or adjusted under 35 U.S.C. 154(b) by 369 days.

(21) Appl. No.: 12/801,995

(22) Filed: Jul. 7, 2010

(65) Prior Publication Data

US 2011/0013245 A1    Jan. 20, 2011

(30) Foreign Application Priority Data

Jul. 17, 2009 (JP) ................................. 2009-169262
Apr. 28, 2010 (JP) ................................. 2010-103950

(51) Int. Cl.
*G02B 3/00* (2006.01)
(52) U.S. Cl. ........................... 359/650; 359/201.1; 345/7
(58) Field of Classification Search ................... 359/630
See application file for complete search history.

(56) References Cited

U.S. PATENT DOCUMENTS

| 5,369,415 | A | * | 11/1994 | Richard et al. ..................... 345/6 |
| 8,059,322 | B1 | * | 11/2011 | Brown ........................ 359/199.1 |
| 2005/0180687 | A1 | | 8/2005 | Amitai |
| 2007/0070859 | A1 | | 3/2007 | Hirayama |
| 2011/0013245 | A1 | * | 1/2011 | Tanaka et al. .............. 359/201.2 |
| 2011/0122500 | A1 | * | 5/2011 | Kobayashi ................... 359/633 |
| 2012/0098734 | A1 | * | 4/2012 | Totani et al. ...................... 345/7 |

FOREIGN PATENT DOCUMENTS

| JP | 2005-521099 | 7/2005 |
| JP | 2006-162767 | 6/2006 |

* cited by examiner

*Primary Examiner* — Jennifer L. Doak
(74) *Attorney, Agent, or Firm* — Rader, Fishman & Grauer PLLC

(57) ABSTRACT

Disclosed herein is an image display device including a light source and a scanner. The scanner includes (a) a first mirror on which a light beam emitted from the light source is incident, (b) a first light deflector on which the light beam output from the first mirror is incident and that outputs collimated light forming a first output angle depending on a first incident angle of the light beam in association with the pivoting of the first mirror, (c) a second mirror on which the collimated light output from the first light deflector is incident, and (d) a second light deflector on which the collimated light output from the second mirror is incident and that outputs collimated light forming a second output angle depending on a second incident angle of the collimated light in association with the pivoting of the second mirror.

22 Claims, 16 Drawing Sheets

FIG.6
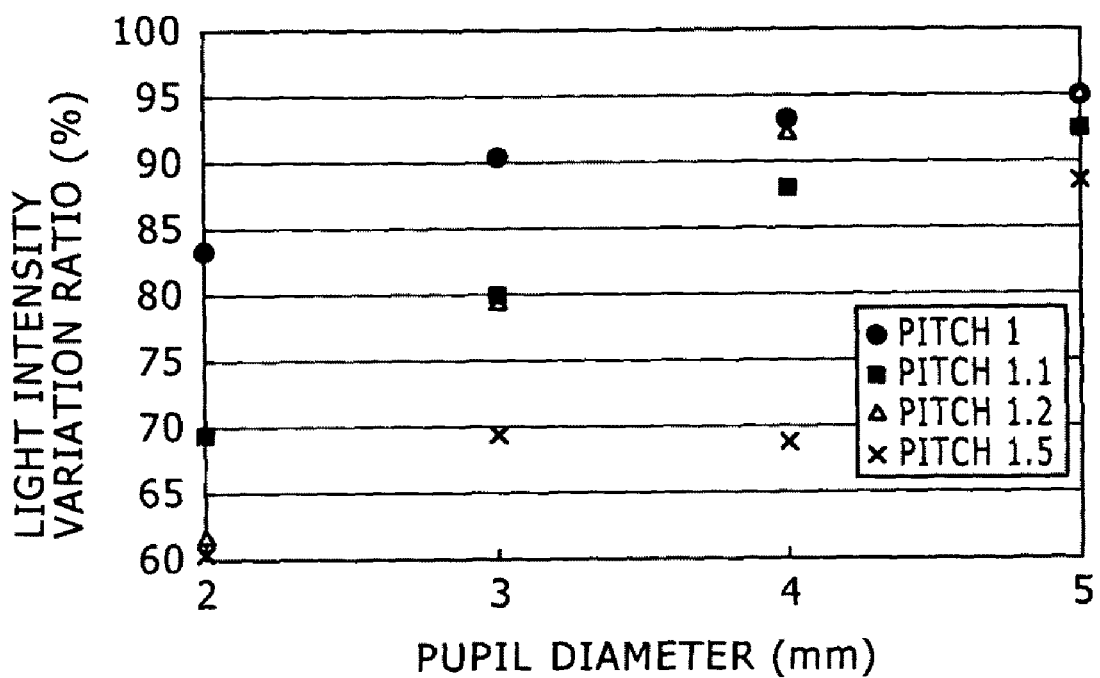
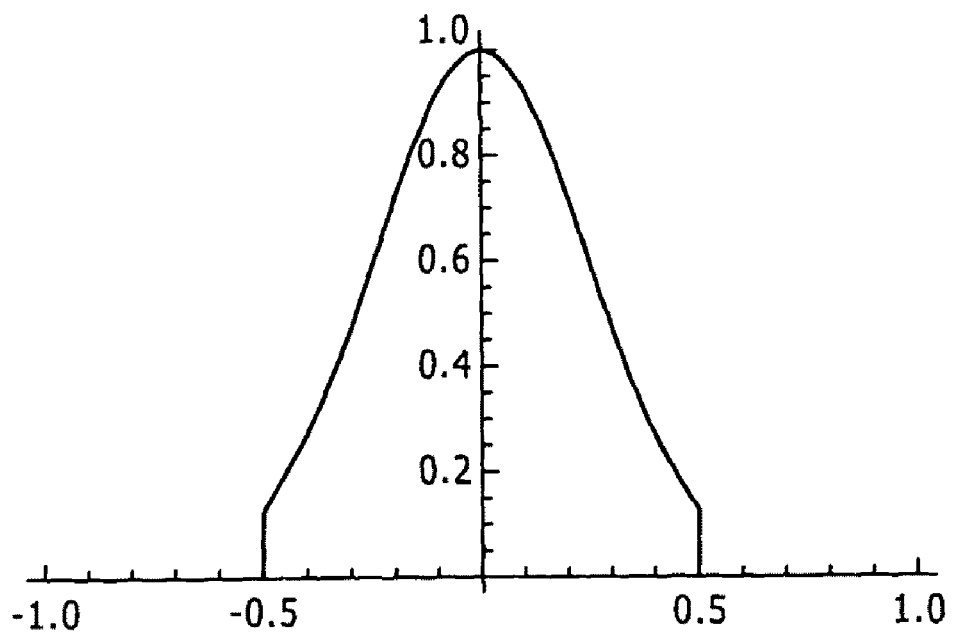

FIG. 7
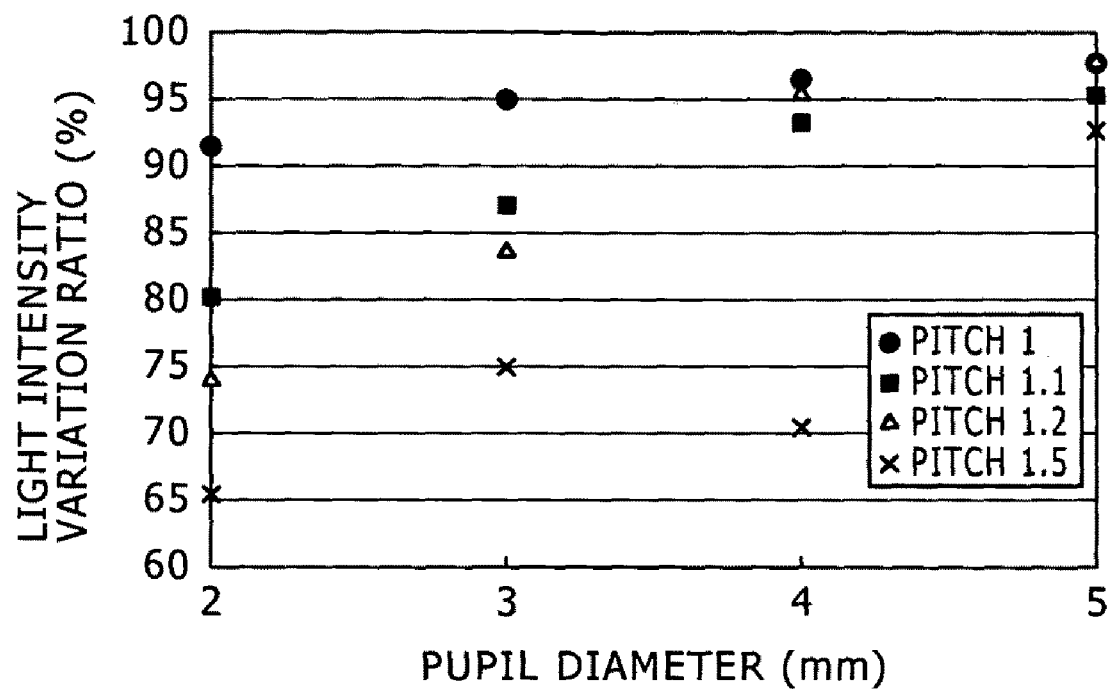
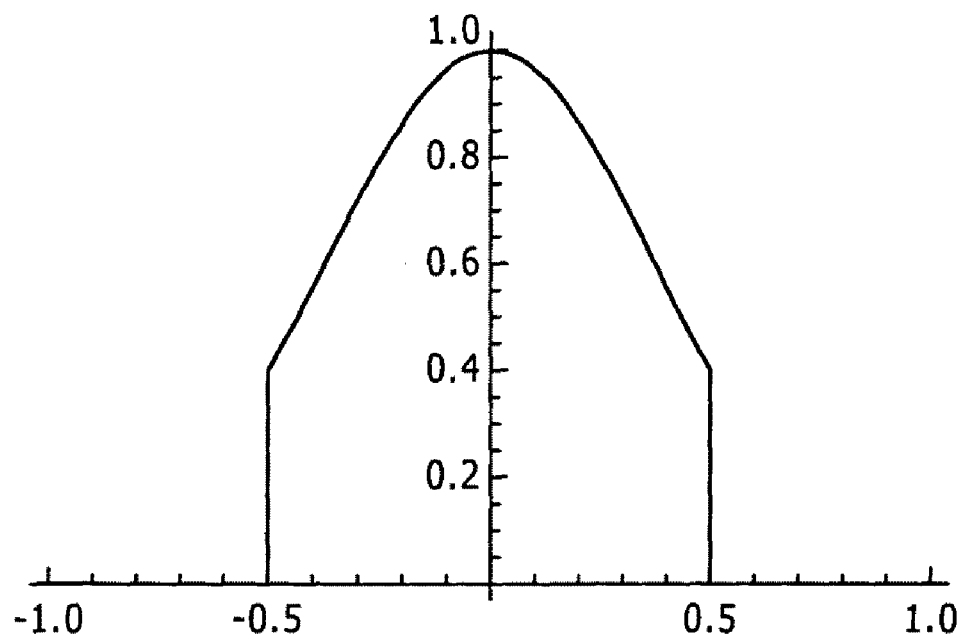

FIG.8
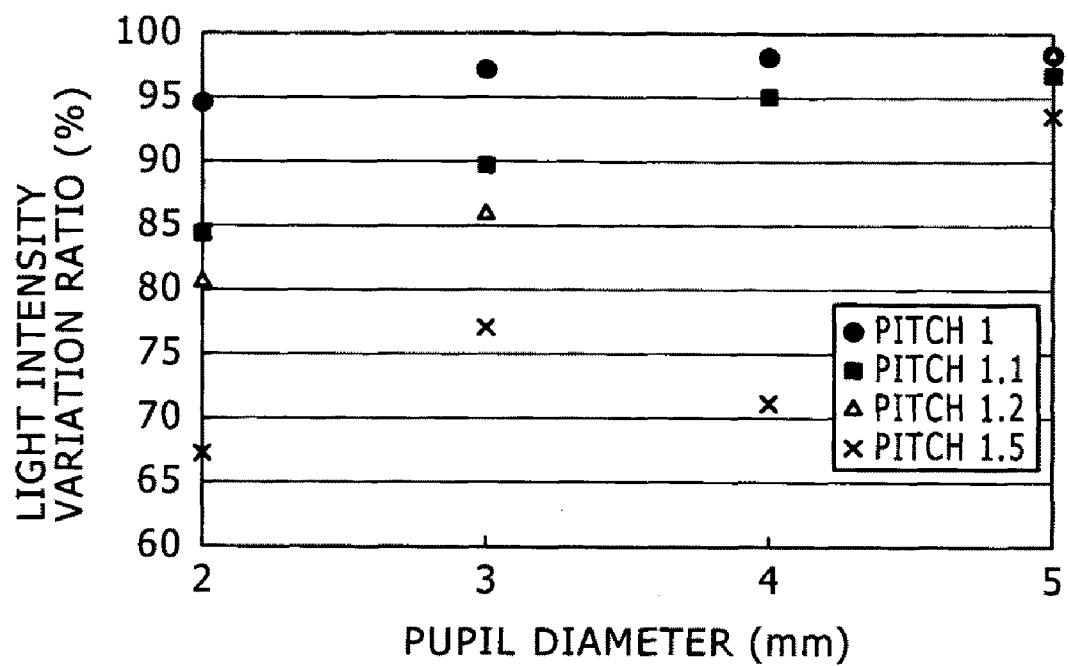
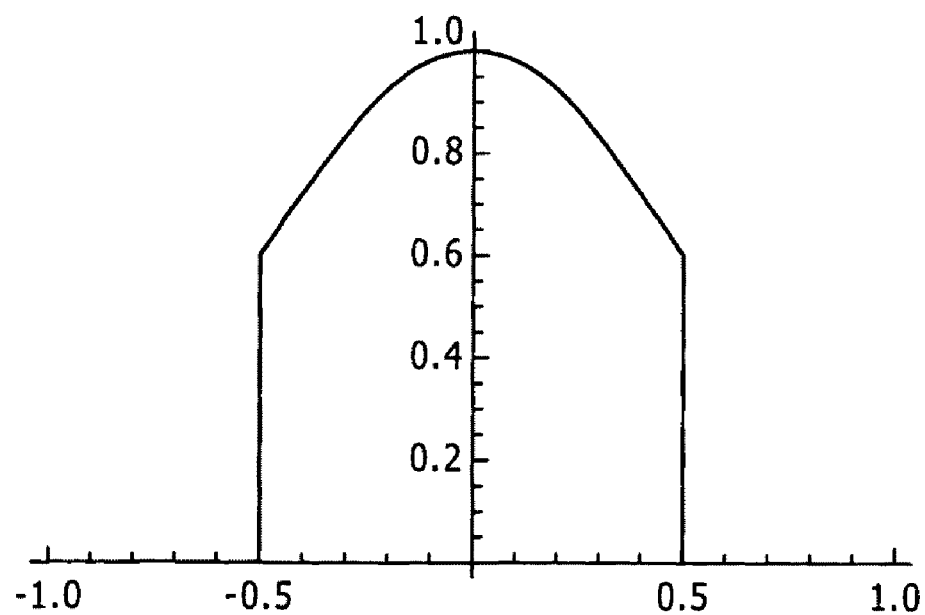

IMAGE DISPLAY DEVICE, HEAD-MOUNTED DISPLAY, AND LIGHT BEAM EXPANDING DEVICE

BACKGROUND OF THE INVENTION

1. Field of the Invention

The present invention relates to an image display device, a head-mounted display, and a light beam expanding device.

2. Description of the Related Art

A virtual-image display device (image display device) for allowing the viewer to view a two-dimensional image formed by an image forming device as an enlarged virtual image by a virtual-image optical system is known from e.g. JP-T-2005-521099 and Japanese Patent Laid-open No. 2006-162767.

As shown in a conceptual diagram of FIG. 14, this image display device 200 includes an image forming device 201 including plural pixels arranged in a two-dimensional matrix, a collimating optical system 202 for turning light output from the pixels of the image forming device 201 to collimated light, and an optical guide unit 203 on which the light turned to the collimated light by the collimating optical system 202 is incident. The incident light is guided in the optical guide unit 203 and output therefrom. The optical guide unit 203 is composed of an optical guide plate 204, a first deflector 205 (formed of e.g. one light reflective film), and a second deflector 206 (formed of e.g. a light reflective multilayer film having a multilayer-stacked structure). The light incident on the optical guide plate 204 is propagated inside the optical guide plate 204 by total reflection and then output therefrom. The first deflector 205 reflects the light incident on the optical guide plate 204 so that this light may be totally reflected inside the optical guide plate 204. The second deflector 206 makes the light propagated inside the optical guide plate 204 by total reflection be output from the optical guide plate 204. If e.g. a head-mounted display (HMD) is formed by using such an image display device 200, reduction in the weight and size of the device can be achieved.

SUMMARY OF THE INVENTION

In the image display device 200 of the related art, the image forming device 201 has a structure including the plural pixels arranged in a two-dimensional matrix and is formed of e.g. a transmissive or reflective liquid crystal display device based on a liquid crystal on silicon (LCOS). Therefore, it is difficult to reduce the size of the image forming device 201. Furthermore, because the image forming device 201 and the collimating optical system 202 are necessary in the image display device 200 of the related art, reduction in the size and weight as the whole of the image display device is also difficult.

There is a need for the present invention to provide an image display device allowed to easily achieve reduction in the size and weight as the whole of the image display device, a head-mounted display to which this image display device is applied, and a light beam expanding device suitable for being applied to this image display device.

According to an embodiment of the present invention, there is provided an image display device including a light source and a scanner for scanning of a light beam emitted from the light source. The scanner includes (a) a first mirror configured to be pivotable about a first axis as a pivot axis extending along a first direction, the light beam emitted from the light source being incident on the first mirror, (b) a first light deflector configured to have an axis line extending along a second direction different from the first direction, a light beam output from the first mirror being incident on the first light deflector at a first incident angle, the first light deflector outputting collimated light that forms a predetermined first output angle with the second direction depending on the first incident angle of the light beam in association with pivoting of the first mirror, (c) a second mirror configured to be pivotable about a second axis as a pivot axis extending along a third direction, the collimated light output from the first light deflector being incident on the second mirror, and (d) a second light deflector configured to have an axis line extending along a fourth direction different from the third direction, collimated light output from the second mirror being incident on the second light deflector at a second incident angle, the second light deflector outputting collimated light that forms a predetermined second output angle with the fourth direction depending on the second incident angle of the collimated light in association with pivoting of the second mirror.

According to another embodiment of the present invention, there is provided a head-mounted display (HMD) including (A) an eyeglasses frame configured to be mounted on the head of a viewer, and (B) an image display device configured to be attached to the frame. This image display device is formed of the above-described image display device of the embodiment of the present invention.

According to another embodiment of the present invention, there is provided a light beam expanding device that two-dimensionally expands a light beam emitted from a light source in a second direction and a fourth direction and outputs the expanded light beam as collimated light. This light beam expanding device has the same configuration as that of the scanner in the above-described image display device of the embodiment of the present invention.

The image display device, the head-mounted display, and the light beam expanding device of the embodiments of the present invention include the first mirror, the first light deflector, the second mirror, and the second light deflector, and turn a light beam emitted from the light source to collimated light to output the collimated light. Therefore, the image forming device itself formed of e.g. a liquid crystal display device is unnecessary. In addition, for example a two-dimensional image does not need to be created as if it was an intermediate image inside the scanner or the light beam expanding device. That is, the imaging optical system is unnecessary. Consequently, reduction in the sizes of the light source and the scanner and reduction in the size and weight as the whole of the image display device can be achieved. In the image display device and the head-mounted display of the embodiments of the present invention, the collimated light that is originally emitted from the light source as a light beam and finally output from the second light deflector enters the eyeball of the viewer. Then the collimated light passes through the pupil (having a diameter of about 2 to 6 mm normally) in the eyeball and is imaged on the retina to be recognized as one pixel. This is because the light output from the second light deflector is collimated light. Repeating this operation plural times allows recognition of a two-dimensional image.

BRIEF DESCRIPTION OF THE DRAWINGS

FIG. 6 is a graph showing a light intensity variation ratio obtained based on the result of simulation of light intensity variation in the pupil when the diameter of a light beam is set to 1.0 mm, the pupil diameter is set to 2 mm, 3 mm, 4 mm, and 5 mm, and the array pitch of the light beam is set to 1.0 times, 1.1 times, 1.2 times, and 1.5 times the diameter of the light beam, and a graph showing the light intensity distribution of the light beam obtained in this simulation;

FIG. 7 is a graph showing a light intensity variation ratio obtained based on the result of simulation of light intensity variation in the pupil when the diameter of a light beam is set to 1.0 mm, the pupil diameter is set to 2 mm, 3 mm, 4 mm, and 5 mm, and the array pitch of the light beam is set to 1.0 times, 1.1 times, 1.2 times, and 1.5 times the diameter of the light beam, and a graph showing the light intensity distribution of the light beam obtained in this simulation;

FIG. 8 is a graph showing a light intensity variation ratio obtained based on the result of simulation of light intensity variation in the pupil when the diameter of a light beam is set to 1.0 mm, the pupil diameter is set to 2 mm, 3 mm, 4 mm, and 5 mm, and the array pitch of the light beam is set to 1.0 times, 1.1 times, 1.2 times, and 1.5 times the diameter of the light beam, and a graph showing the light intensity distribution of the light beam obtained in this simulation;

DETAILED DESCRIPTION OF THE PREFERRED EMBODIMENTS

Figure 1A:
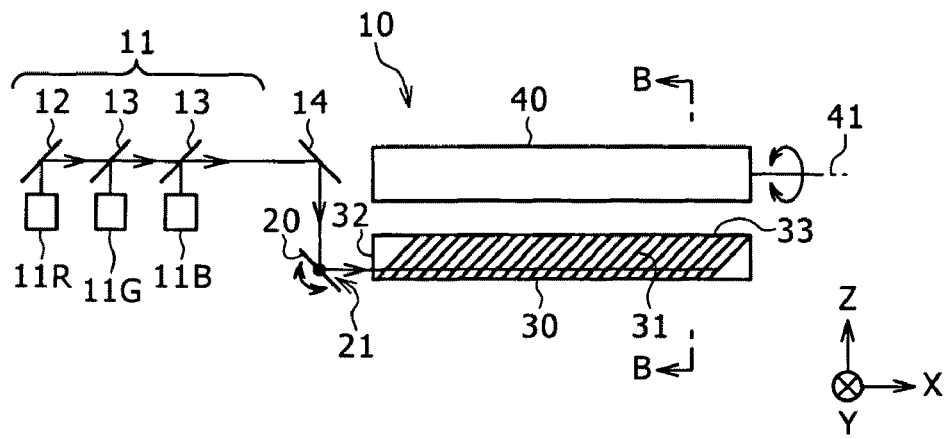
FIGS. 1A and 1B are conceptual diagrams of an image display device and a light beam expanding device of embodiment example 1.

The present invention will be described below based on embodiment examples thereof with reference to the drawings. However, the present invention is not limited to the embodiment examples and various numeric values and materials in the embodiment examples are merely examples. The description will be made in the following order.

1. Description Relating to General Techniques of Image Display Device, Head-Mounted Display, and Light Beam Expanding Device of the Present Invention
2. Embodiment Example 1 (Image Display Device and Light Beam Expanding Device)
3. Embodiment Example 2 (Modification of Embodiment Example 1)
4. Embodiment Example 3 (Another Modification of Embodiment Example 1)
5. Embodiment Example 4 (Head-Mounted Display) and Others

[Description Relating to General Techniques of Image Display Device, Head-Mounted Display, and Light Beam Expanding Device of Embodiments of the Present Invention]

The head-mounted display of the embodiments of the present invention may have the following configuration.

The frame is composed of a front part disposed in front of the viewer, two temple parts pivotably attached to both ends of the front part with the intermediary of hinges, and end parts attached to the tips of the temple parts.

The light source is disposed at an upper part of the temple part or the front part.

The first mirror, the first light deflector, and the second mirror are disposed at an upper part of the front part.

The second light deflector is so disposed as to be opposed to a pupil of the viewer (i.e. disposed at the position equivalent to the lens-attached position in the frame of normal eyeglasses). This unit arrangement is for the case in which the viewer has sufficiently-good naked-eye eyesight or uses a contact lens or the like. However, it is also possible to dispose the second light deflector outside the lens of the eyeglasses for the viewer whose eyesight is corrected by normal eyeglasses.

Alternatively, it is also possible to employ a configuration in which the first mirror, the first light deflector, the second mirror, and the second light deflector are disposed at an upper part of the front part.

In the image display device of the embodiments of the present invention, the scanner included in the head-mounted display of the embodiments of the present invention including the above-described preferred configuration, and the light beam expanding device of the embodiments of the present invention (hereinafter, they will be referred to collectively as "the scanner and so forth in the embodiments of the present invention"), it is possible to employ a form in which, if the first output angle $\theta_{O\text{-}1}$ of the collimated light output from the first light deflector in such a direction as to get away from the first mirror is defined as the output angle of a positive value, the first output angle $\theta_{O\text{-}1}$ changes in the direction from the negative value to the positive value as the first incident angle $\theta_{I\text{-}1}$ of the light beam to the first light deflector becomes larger. Furthermore, in this case, it is possible to employ a form in which, if the second output angle $\theta_{O\text{-}2}$ of the collimated light output from the second light deflector in such a direction as to get away from the second mirror is defined as the output angle of a positive value, the second output angle $\theta_{O\text{-}2}$ changes in the direction from the negative value to the positive value as the second incident angle $\theta_{I\text{-}2}$ of the collimated light to the second light deflector becomes larger. The first incident angle $\theta_{I\text{-}1}$ is defined as the angle formed by the light beam incident on the first light deflector and the second direction. The first output angle $\theta_{O\text{-}1}$ is defined as the angle formed by the collimated light output from the first light deflector and the normal to the collimated light output surface of the first light deflector. Similarly, the second incident angle $\theta_{I\text{-}2}$ is defined as the angle formed by the collimated light incident on the second light deflector and the fourth direction. The second output angle $\theta_{O\text{-}2}$ is defined as the angle formed by the collimated light output from the second light deflector and the normal to the collimated light output surface of the second light deflector. Furthermore, the first incident angle $\theta_{I\text{-}1}$ formed by the second direction and the light beam that is propagated inside the first light deflector and travels toward the collimated light output surface of the first light deflector is defined as the incident angle of a positive value. Similarly, the second incident angle $\theta_{I\text{-}2}$ formed by the fourth direction and the collimated light that is propagated inside the second light deflector and travels toward the collimated light output surface of the second light deflector is defined as the incident angle of a positive value.

The scanner and so forth in the embodiments of the present invention including the above-described preferred forms may have a configuration in which the light beam incident on the first light deflector is expanded in the second direction by the first light deflector and the collimated light incident on the second light deflector is expanded in the fourth direction by the second light deflector. By this configuration, the collimated light finally obtained results from two-dimensional expansion in the second direction and the fourth direction.

Furthermore, the image display device and the head-mounted display of the embodiments of the present invention including the above-described preferred forms and configuration may have the following configuration. Specifically, an image is formed by total P×Q pixels that are so arranged that P pixels are arranged along the second direction and Q pixels are arranged along the fourth direction. In addition, the first incident angle $\theta_{I\text{-}1}$ is defined depending on the positions of P pixels along the second direction and the second incident angle $\theta_{I\text{-}2}$ is defined depending on the positions of Q pixels along the fourth direction. By one time of emission of the light beam from the light source, one pixel in the display image is obtained finally. Therefore, P×Q times of emission of the light beam are required to display an image composed of P×Q pixels. The first mirror and the second mirror have a function to convert pixel position information to a kind of angle information. It is preferable that the second direction and the fourth direction be perpendicular to each other.

In the image display device and the head-mounted display of the embodiments of the present invention including the above-described preferred forms and configurations, it is preferable to employ a configuration in which the number of times of pivoting of the first mirror per unit time (vibrational frequency) is larger than the number of times of pivoting of the second mirror per unit time (vibrational frequency). However, a configuration in which the number of times of pivoting of the second mirror is larger may be employed. For the pivoting of the first mirror and the second mirror, e.g. a sine wave signal, a rectangular wave signal, or a saw wave signal is input to a pivoter provided for the first mirror and the second mirror. The frequency of the signal for driving the first mirror is decided depending on the number of pixels along the second direction, the duty of the second mirror, the frame rate, and so forth, and is e.g. about several kilohertz to several hundred kilohertz. The frequency of the signal for driving the second mirror is decided depending on the frame rate and so forth, and is e.g. 15 hertz, 30 hertz, 60 hertz, 120 hertz, 180 hertz, or 240 hertz. If the first mirror and the second mirror are formed by using micro electro mechanical systems (MEMS) having a micromirror pivotable about one axis, the high-speed pivoting of the first mirror can be performed based on resonance whereas the low-speed pivoting of the second mirror can be performed not based on resonance for example.

Moreover, in the image display device and the head-mounted display of the embodiments of the present invention including the above-described preferred forms and configurations, it is possible to employ a form in which the first direction and the fourth direction correspond with each other (are parallel to each other) and the second direction and the third direction correspond with each other (are parallel to each other) and the first direction and the fourth direction are perpendicular to the second direction and the third direction. Furthermore, in this case, it is possible to employ a form in which the image viewing position is located in the fifth direction from the viewpoint of the second light deflector and the fifth direction is perpendicular to the first direction and the fourth direction and perpendicular to the second direction and the third direction. However, the respective directions do not necessarily need to be in the parallel and perpendicular relationship.

The image display device, the head-mounted display, and the light beam expanding device of the embodiments of the present invention including the above-described preferred forms and configurations may have a configuration in which a plurality of semi-transmissive mirrors (half mirrors) are provided inside the first light deflector and a plurality of semi-transmissive mirrors (half mirrors) are provided inside the second light deflector. However, they are not limited thereto, but polarizing beam splitters may be provided instead of the semi-transmissive mirrors. The semi-transmissive mirror can be formed by using a metal film composed of a metal containing an alloy, or it can be formed by using a multi-layer stacked structure obtained by stacking a large number of dielectric stacked films. The dielectric stacked film is composed of e.g. a $TiO_2$ film as a high dielectric constant material and an $SiO_2$ film as a low dielectric constant material. Hereinafter, the metal film, the multi-layer stacked structure, the polarizing beam splitter, and so forth that reflect part of light and allow the transmission (passage) of the remaining part of the light therethrough will be referred to collectively as "the light reflective/transmissive film" for convenience. The light reflective/transmissive film can be formed by any of various kinds of physical vapor deposition (PVD) methods including a vacuum evaporation method and a sputtering method and various kinds of chemical vapor deposition (CVD) methods, depending on the materials used.

A large number of light reflective/transmissive films are formed inside the first light deflector and the second light deflector. It is desirable that the light reflectance of the light reflective/transmissive films in the first light deflector or the second light deflector be equal to or lower than 30%, preferably equal to or lower than 10%, more preferably equal to or lower than 5%, in perpendicular incidence. The large number of light reflective/transmissive films may be made to have the same light reflectance. Alternatively, the light reflectance may be changed depending on the position of the light reflective/transmissive film inside the first light deflector or the second light deflector. In the latter case, specifically, it is preferable in the first light deflector that the light reflectance of the light reflective/transmissive film located at a position remoter from the first mirror be set higher, and it is preferable in the second light deflector that the light reflectance of the light reflective/transmissive film located at a position remoter from the second mirror be set higher. In other words, it is preferable in the first light deflector that the light transmittance of the light reflective/transmissive film located at a position remoter from the first mirror be set lower, and it is preferable in the second light deflector that the light transmittance of the light reflective/transmissive film located at a position remoter from the second mirror be set lower. The dependency of the light transmittance of the light reflective/transmissive film on the light incident angle (such a relationship that the light reflectance is higher when the incident angle of the light incident on the light reflective/transmissive film is larger) may be utilized. By gradually increasing the light reflectance in this manner, the intensity of light reflected by part of the first light deflector located at a position remote from the first mirror can be brought close to the intensity of light reflected by part of the first light deflector located at a position near the first mirror. This feature applies also to the second light deflector. The light beam incident from the first mirror transmits (passes) through the plural light reflective/transmissive films provided inside the first light deflector and is reflected by the light reflective/transmissive films, so that the light beam is turned to collimated light and output from the first light deflector. The collimated light incident from the second mirror transmits (passes) through the plural light reflective/transmissive films provided inside the second light deflector and is reflected by the light reflective/transmissive films, so that the collimated light is output from the second light deflector. The angle of the light reflective/transmissive film in the first light deflector with respect to the second direction is the same in all of the light reflective/transmissive films, and is 30 degrees to 70 degrees, preferably 40 degrees to 60 degrees, and more preferably 45 degrees to 55 degrees, for example. Similarly, the angle of the light reflective/transmissive film in the second light deflector with respect to the fourth direction is the same in all of the light reflective/transmissive films, and is 30 degrees to 70 degrees, preferably 40 degrees to 60 degrees, and more preferably 45 degrees to 55 degrees, for example. The array pitch of the light reflective/transmissive films may be constant or may be changed. It is preferable that a see-through (semi-transmissive) light deflector be employed as the second light deflector so that the external field can be viewed via the second light deflector. As an example of the dimensions of the first light deflector, the length (length along the second direction) is 5 mm or longer, the height (length along the fourth direction) is 0.5 mm or longer, and the thickness (length along the fifth direction) is 0.5 mm or longer. As an example of the dimensions of the second light deflector, the length (length along the second direction) is 5 mm or longer, the height (length along the fourth direction) is 5 mm or longer, and the thickness (length along the fifth direction) is 0.5 mm or longer.

Figure 15:
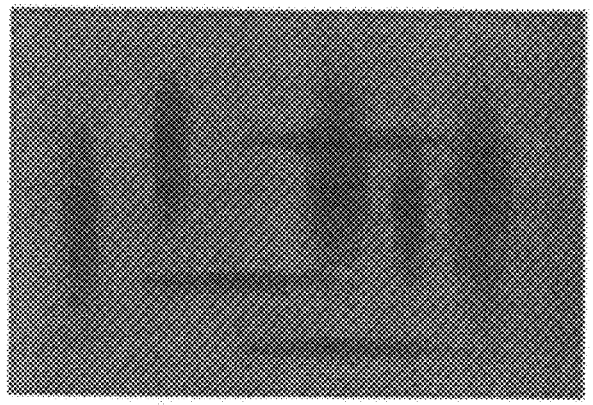
FIG. 15 is a diagram showing the state in which streak patches arise in an image due to light beam interference.
Figure 17A:
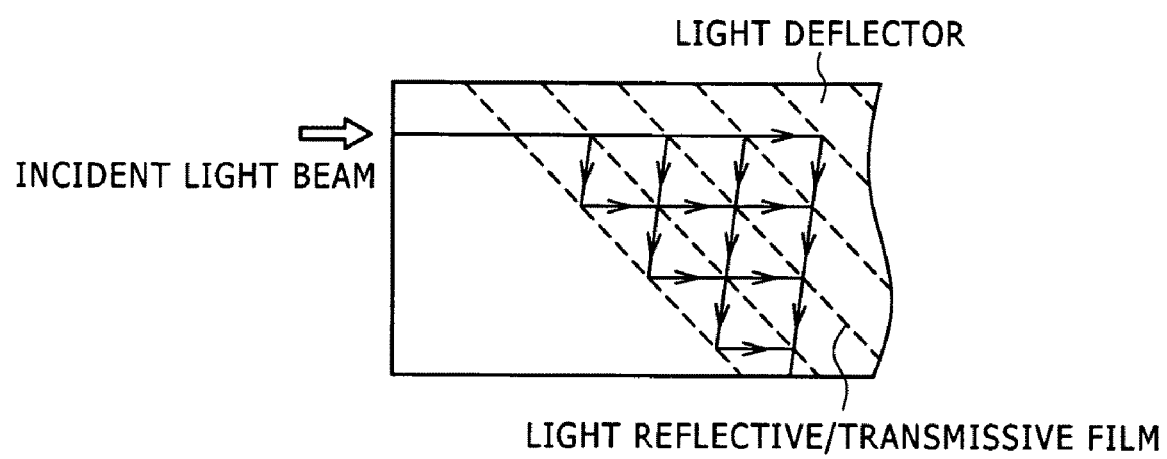
FIGS. 17A and 17B are diagrams for explaining one of methods allowing avoidance of the state in which streak patches arise in an image due to light beam interference.
Figure 17B:
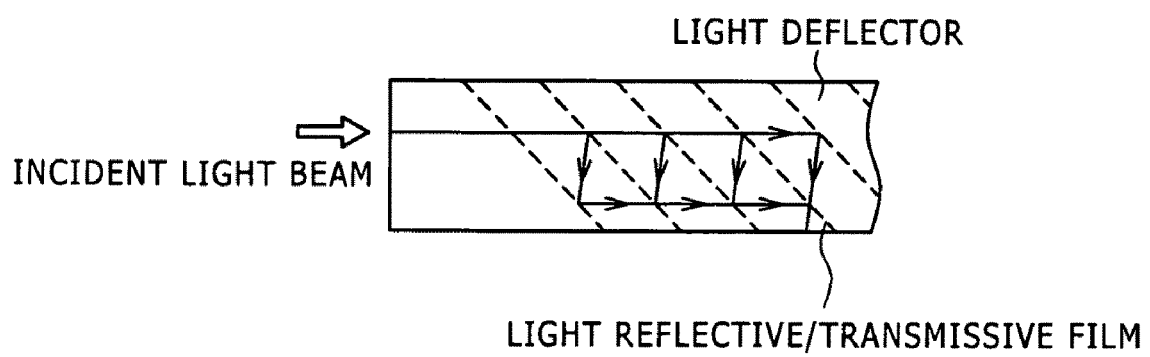

If the light intensity of a light beam output from the first light deflector or the second light deflector after being reflected plural times by the semi-transmissive mirror or the light reflective/transmissive film (hereinafter, they will be often referred to simply as "the semi-transmissive mirror or the like" collectively) provided inside the first light deflector or the second light deflector (for convenience, this light beam will be referred to as "the branched light beam") is so high as to be unignorable with respect to the light intensity of a light beam output from the first light deflector or the second light deflector after being reflected one time (for convenience, this light beam will be referred to as "the main light beam"), streak patches (unevenness) arise in the image attributed to the interference between the main light beam and the branched light beam in some cases (see FIG. 15). To prevent the occurrence of such a phenomenon, it is effective to reduce the number of branched light beams. For this purpose, it is effective to reduce the number of semi-transmissive mirrors or the like or decrease the thickness of the first light deflector (the thickness of the first light deflector when the first light deflector is cut along a virtual plane perpendicular to the second direction) or the thickness of the second light deflector (the thickness of the second light deflector when the second light deflector is cut along a virtual plane perpendicular to the fourth direction). As shown in schematic diagrams of FIGS. 17A and 17B, the number of branched light beams can be reduced if the thickness of the light deflector is decreased. Only one light beam is shown in FIGS. 17A and 17B for simplification of the diagram. However, such a countermeasure often involves difficulty in the design of the first light deflector or the second light deflector.

Therefore, to suppress the occurrence of such a phenomenon, it is preferable that variation $b_1$ in the pitch of the plural semi-transmissive mirrors (or the light reflective/transmissive films) provided inside the first light deflector along the second direction satisfy the following expression if the peak wavelength of the emission spectrum of the light source is defined as $\lambda$ and the spectrum half-value width is defined as $\Delta\lambda$.

$$b_1 \geq \lambda^2/(3\pi\Delta\lambda)$$

In this case, it is desirable that the light reflectance of the semi-transmissive mirrors (or the light reflective/transmissive films) provided inside the first light deflector be equal to or lower than 10%, preferably equal to or lower than 5%, in perpendicular incidence.

Furthermore, if plural semi-transmissive mirrors (or light reflective/transmissive films) are provided inside the second light deflector in the image display device, the head-mounted display, or the light beam, expanding device of the embodiments of the present invention including the above-described preferred configuration of the first light deflector, it is preferable that variation $b_2$ in the pitch of the plural semi-transmissive mirrors (or the light reflective/transmissive films) provided inside the second light deflector along the fourth direction satisfy the following expression if the peak wavelength of the emission spectrum of the light source is defined as $\lambda$ and the spectrum half-value width is defined as $\Delta\lambda$.

$$b_2 \geq \lambda^2/(3\pi\Delta\lambda)$$

In this case, it is desirable that the light reflectance of the semi-transmissive mirrors (or the light reflective/transmissive films) provided inside the second light deflector be equal to or lower than 10%, preferably equal to or lower than 5%, in perpendicular incidence.

By giving the variations $b_1$ and $b_2$ to the pitches of the plural semi-transmissive mirrors or the like in this manner, an optical path difference is generated between the light beams. As a result, the interference between the main light beam and the branched light beam occurs less readily, and the arising of streak patches in the image can be suppressed.

Figure 16:
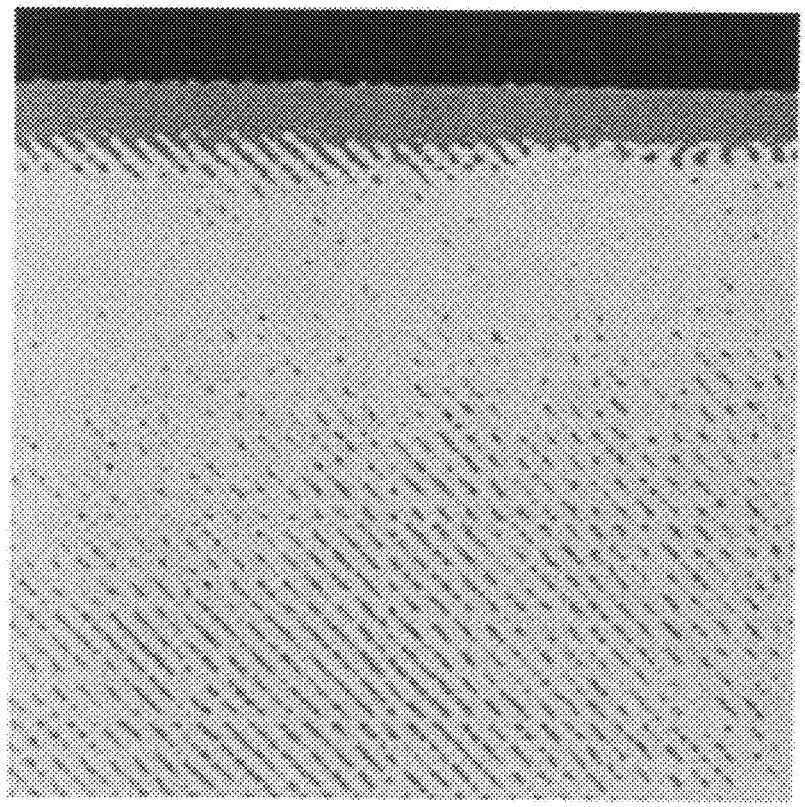
FIG. 16 is a diagram showing the state in which dot patches arise in an image due to light beam interference.

In addition, in the case of the semi-transmissive mirrors or the like provided inside the first light deflector or the second light deflector, a light beam reflected by a certain semi-transmissive mirror or the like and e.g. a light beam reflected by a semi-transmissive mirror or the like adjacent to this semi-transmissive mirror or the like interfere with each other, and dot patches arise in some cases (see FIG. 16). This phenomenon possibly occurs when the light beams reflected by adjacent semi-transmissive mirrors or the like overlap with each other (or when the diameter of the light beam is substantially larger than the pitch of the provided semi-transmissive mirrors or the like).

Therefore, to suppress the occurrence of such a phenomenon, it is preferable that the following expressions be satisfied if the diameter of the light beam incident on the first light deflector is defined as $D_1$, the pitch of the plural semi-transmissive mirrors (or the light reflective/transmissive films) provided inside the first light deflector along the second direction is defined as $B_1$, the peak wavelength of the emission spectrum of the light source is defined as $\lambda$, and the spectrum half-value width is defined as $\Delta\lambda$.

$$D_1 > B_1$$

$$B_1 > \lambda^2/(2\pi\Delta\lambda)$$

In this case, it is desirable that the light reflectance of the semi-transmissive mirrors (or the light reflective/transmissive films) provided inside the first light deflector be equal to or lower than 10%, preferably equal to or lower than 5%, in perpendicular incidence.

Furthermore, if plural semi-transmissive mirrors (or light reflective/transmissive films) are provided inside the second light deflector in the image display device, the head-mounted display, or the light beam expanding device of the embodiments of the present invention including the above-described preferred configuration of the first light deflector, it is preferable that the following expressions be satisfied if the diameter of the light beam incident on the second light deflector is defined as $D_2$, the pitch of the plural semi-transmissive mirrors (or the light reflective/transmissive films) provided inside the second light deflector along the fourth direction is defined as $B_2$, the peak wavelength of the emission spectrum of the light source is defined as $\lambda$, and the spectrum half-value width is defined as $\Delta\lambda$.

$$D_2 > B_2$$

$$B_2 > \lambda^2/(2\pi\Delta\lambda)$$

In this case, it is desirable that the light reflectance of the semi-transmissive mirrors (or the light reflective/transmissive films) provided inside the second light deflector be equal to or lower than 10%, preferably equal to or lower than 5%, in perpendicular incidence.

By defining the pitches $B_1$ and $B_2$ of the plural semi-transmissive mirrors or the like in this manner, the interference between a light beam reflected by a certain semi-transmissive mirror or the like and e.g. a light beam reflected by a semi-transmissive mirror or the like adjacent to this semi-transmissive mirror or the like occurs less readily. As a result, the arising of dot patches in the image can be suppressed.

Moreover, in the image display device, the head-mounted display, and the light beam expanding device of the embodiments of the present invention including the above-described preferred forms and configurations, it is preferable to employ a configuration in which an anti-reflection coating is provided on the light beam incident surface and the collimated light output surface of the first light deflector. Furthermore, it is preferable to employ a configuration in which an anti-reflection coating is provided on each of the collimated light incident surface, the collimated light output surface, and the surface opposed to the collimated light output surface, of the second light deflector. It is possible to employ a form in which the anti-reflection coating (ARC) is composed of at least one kind of material selected from the group including e.g. silicon oxide ($SiO_X$), tantalum oxide ($TaO_X$), zirconium oxide ($ZrO_X$), aluminum oxide ($AlO_X$), chromium oxide ($CrO_X$), vanadium oxide ($VO_X$), titanium oxide (TiO), zinc oxide (ZnO), tin oxide (SnO), hafnium oxide ($HfO_X$), niobium oxide ($NbO_X$), scandium oxide ($ScO_X$), yttrium oxide ($YO_X$), silicon nitride ($SiN_Y$), titanium nitride (TiN), tantalum nitride (TaN), aluminum nitride (AlN), silicon oxynitride ($SiO_XN_Y$), aluminum fluoride ($AlF_X$), cerium fluoride ($CeF_X$), calcium fluoride ($CaF_X$), sodium fluoride ($NaP_X$), sodium aluminum fluoride ($Na_YAl_ZF_X$), lanthanum fluoride ($LaF_X$), magnesium fluoride ($MgF_X$), yttrium fluoride ($YF_X$), and zinc sulfide ($ZnS_X$). Alternatively, depending on the case, it is also possible that the anti-reflection coating has a structure obtained by stacking at least two layers of a dielectric thin film of e.g. SiO, $SiO_2$, $TiO_2$, $ZrO_2$, $Ta_2O_5$, and $Y_2O_3$ (multi-layer structure formed of e.g. high refractive index film/low refractive index film/high refractive index film/low refractive index film . . . ). The anti-reflection coating can be formed by any of various kinds of PVD methods including a vacuum evaporation method and a sputtering method and various kinds of CVD methods, depending on the materials used.

In the image display device and the head-mounted display of the embodiments of the present invention including the above-described preferred forms and configurations, it is preferable that the light source be formed of a light emitting element, specifically a semiconductor laser element (LD), a solid-state laser, a light emitting diode (LED), a superluminescence diode (SLD), an organic EL light emitting element, or an inorganic EL light emitting element. Furthermore, the light source in the broad sense also encompasses an optical fiber output end when any of the above-described various kinds of light sources is introduced into an optical fiber. It is preferable that the light source be composed of a light emitting element for red light emission, a light emitting element for green light emission, and a light emitting element for blue light emission and include a multiplexer (color synthesizer) that synthesizes red light beam, green light beam, and blue light beam emitted from these light emitting elements into one light beam. Examples of the multiplexer include a dichroic prism, a dichroic mirror, a cross prism, a polarizing beam splitter, and a half mirror. A light beam shaper (e.g. collimating lens) for turning the light beam emitted from the light source to a collimated light beam may be disposed between the light source and the first mirror. This collimating lens merely allows the passage of one or plural light beams therethrough. Thus, a large lens for allowing the passage of light rays equivalent to an actual image is unnecessary as the collimating lens differently from the collimating optical system in the related art. An aperture may be provided to make the sectional shape of the light beam and prevent the arising of undesired scattered light and stray light. The aperture is disposed between the light source and the first mirror or between the first mirror and the first light deflector. Examples of the shape of the aperture include a circle, a square, a rectangle, a regular hexagon, and a regular octagon. An example of the area of the aperture is $8 \times 10^{-5}$ cm$^2$ (equivalent to a diameter of 0.1 mm in the case of the circle) to 0.8 cm$^2$ (equivalent to a diameter of 10 mm in the case of the circle). The intensity of the light beam emitted from the light source depends on the brightness of the image that should be displayed. In addition, the positions of the pixels in the image that should be displayed may also be taken into consideration to decide the intensity of the light beam emitted from the light source. Specifically, for example, when the first incident angle $\theta_{I-1}$ and the second incident angle $\theta_{I-2}$ are small, the number of light reflective/transmissive films through which the light beam and the collimated light pass increase, and therefore the intensity of the light beam emitted from the light source may be increased.

Examples of the first mirror and the second mirror include MEMS having a micromirror pivotable about one axis, a galvano mirror, and a polygon mirror. However, the mirrors do not necessarily need to be used, but any scanner or scanning system such as an electro-optical scanner, an acoustic-optical scanner, moving of the collimating lens, or pivoting of the light source itself may be used. That is, a first scanner may be used instead of the first mirror and a second scanner may be used instead of the second mirror.

The first light deflector and the second light deflector are fabricated by using a material that is transparent to incident light. Examples of the material for forming the first light deflector and the second light deflector include glass including optical glass such as quartz glass and BK7 and plastic materials (e.g. PMMA, a polycarbonate resin, an acrylic resin, an amorphous polypropylene resin, and styrene resin containing an AS resin). Normal optical glass such as BK7 has high processing accuracy and reliability and therefore is a preferable material. Using a material having a high refractive index can decrease the thicknesses of the first light deflector and the second light deflector, and therefore it is more preferable that the refractive index of the material be equal to or higher than 1.6 for example.

The number of pixels can be decided based on the specifications required for the image display device. Specific examples of the number of pixels include 320×240, 432×240, 640×480, 854×480, 1024×768, 1366×768 and 1920×1080.

For example a head-mounted display can be formed by using the image display device of the embodiments of the present invention, and reduction in the weight and size of the device can be achieved. In the head-mounted display, the number of image display devices of the embodiments of the present invention may be one (display for a single eye) or may be two (display for both eyes).

As described above, the frame is composed of the front part disposed in front of the viewer, two temple parts pivotably attached to both ends of the front part with the intermediary of hinges, and end parts attached to the tips of the temple parts. Furthermore, the frame includes a nose pad. When the whole of the head-mounted display is viewed, the assembly of the frame and the nose pad has almost the same structure as that of normal eyeglasses substantially. The frame can be formed by using the same material as that of normal eyeglasses, such as metals, alloys, plastic, and a combination of these materials. The nose pad may also have known configuration and structure.

In terms of the design of the head-mounted display or easiness of mounting of the head-mounted display, it is preferable to employ a form in which interconnects (signal lines, power supply lines, and so forth) from one or two image display devices pass through the inside of the temple parts and the end parts and are extended from the tips of the end parts to the external to be connected to an external circuit (control circuit). Furthermore, it is more preferable to employ a form in which the image display device is provided with a headphone and a headphone interconnect from the image display device passes through the inside of the temple part and the end part and is extended from the tip of the end part to the headphone. Examples of the headphone include an inner-ear headphone and a canal headphone. More specifically, it is preferable to employ a form in which the headphone interconnect is routed from the tip of the end part to the headphone via the backside of the ear auricle (auditory capsule).

[Embodiment Example 1]

Figure 1B:
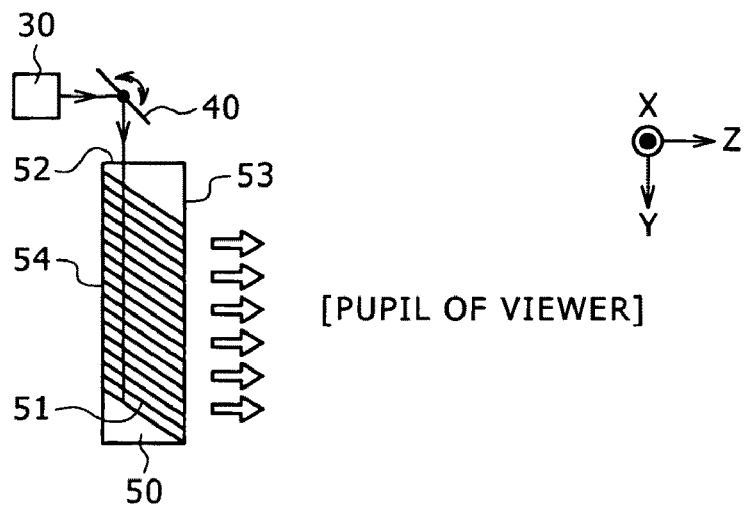
Figure 1C:
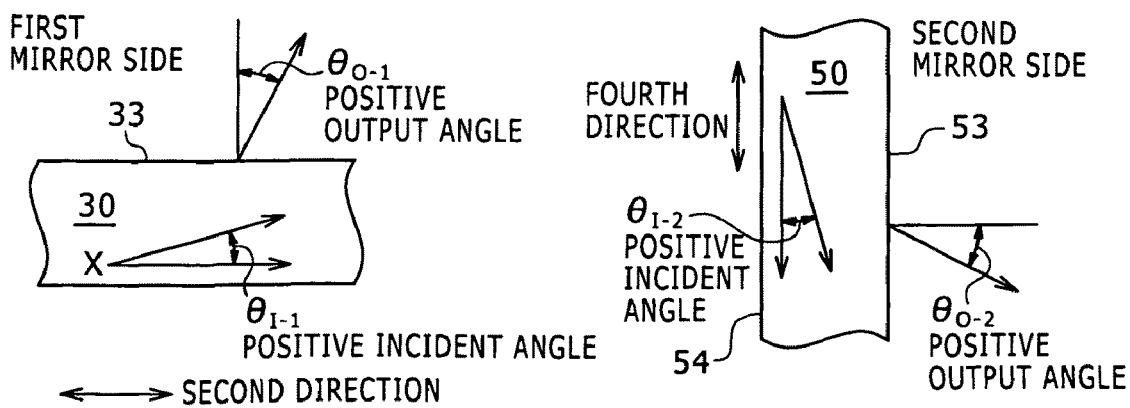
FIG. 1C is a conceptual diagram for explaining the incident angle and the output angle.

Embodiment example 1 relates to the image display device of the present invention and the light beam expanding device of the present invention. FIGS. 1A and 1B are conceptual diagrams of the image display device and the light beam expanding device of embodiment example 1. Specifically, FIG. 1A is a conceptual diagram of the image display device and the light beam expanding device in a virtual plane including a second direction and a fifth direction (XZ plane). FIG. 1B is a conceptual diagram of the image display device and the light beam expanding device in a virtual plane including a fourth direction and the fifth direction (YZ plane) along arrowhead line B-B in FIG. 1A. FIG. 1C is a conceptual diagram for explaining the incident angle and the output angle. In FIG. 1C, diagrammatic representation of the light reflective/transmissive films is omitted. FIGS. 1A to 5B show such a unit arrangement that light is output from a first light deflector 30 in the positive Z-axis direction and then output from a second mirror 40 in the positive Y-axis direction (i.e. in the downward direction). However, it is also possible to employ such a unit arrangement that light is output from the first light deflector 30 in the negative Z-axis direction and then output from the second mirror 40 in the positive Y-axis direction (i.e. in the downward direction).

An image display device 10 of embodiment example 1 includes a light source 11 and a scanner for scanning of a light beam emitted from the light source 11. The scanner includes (a) a first mirror 20 that is pivotable about a first axis 21 as a pivot axis extending along a first direction, the light beam emitted from the light source 11 being incident on the first mirror 20, (b) the first light deflector 30 that has an axis line extending along the second direction different from the first direction, a light beam output from the first mirror 20 being incident on the first light deflector 30 at a first incident angle $\theta_{I-1}$, the first light deflector 30 outputting collimated light that forms a predetermined first output angle $\theta_{O-1}$ with the second direction depending on the first incident angle $\theta_{I-1}$ of the light beam in association with the pivoting of the first mirror 20, (c) the second mirror 40 that is pivotable about a second axis 41 as a pivot axis extending along a third direction, the collimated light output from the first light deflector 30 being incident on the second mirror 40, and (d) a second light deflector 50 that has an axis line extending along the fourth direction different from the third direction, collimated light output from the second mirror 40 being incident on the second light deflector 50 at a second incident angle $\theta_{I-2}$, the second light deflector 50 outputting collimated light that forms a predetermined second output angle $\theta_{O-2}$ with the fourth direction depending on the second incident angle $\theta_{I-2}$ of the collimated light in association with the pivoting of the second mirror 40.

The light beam expanding device of embodiment example 1 is a device that two-dimensionally expands the light beam emitted from the light source 11 in the second direction and the fourth direction and outputs the expanded light beam as collimated light. This light beam expanding device has the same configuration as that of the scanner in the image display device 10 of embodiment example 1.

As shown in the conceptual diagrams of FIGS. 1C and 2A to 5B, when the first output angle $\theta_{O-1}$ of the collimated light output from the first light deflector 30 in such a direction as to get away from the first mirror 20 is defined as the output angle of a positive value, the first output angle $\theta_{O-1}$ changes in the direction from the negative value to the positive value as the first incident angle $\theta_{I-1}$ of the light beam to the first light deflector 30 becomes larger. Furthermore, when the second output angle $\theta_{O-2}$ of the collimated light output from the second light deflector 50 in such a direction as to get away from the second mirror 40 is defined as the output angle of a positive value, the second output angle $\theta_{O-2}$ changes in the direction from the negative value to the positive value as the second incident angle $\theta_{I-2}$ of the collimated light to the second light deflector 50 becomes larger.

FIG. 2A, FIG. 3A, FIG. 4A, and FIG. 5A are conceptual diagrams of the image display device and the light beam expanding device in the virtual plane including the second direction and the fifth direction (XZ plane) as with FIG. 1A. FIG. 2B, FIG. 3B, FIG. 4B, and FIG. 5B are conceptual diagrams of the image display device and the light beam expanding device in the virtual plane including the fourth direction and the fifth direction (YZ plane) as with FIG. 1B.

The image is formed by total P×Q pixels that are so arranged that P pixels are arranged along the second direction and Q pixels are arranged along the fourth direction. Specifically, P is 640, Q is 480, and the diagonal angle of view is 28 degrees, for example. The first incident angle $\theta_{I-1}$ is defined depending on the positions of P pixels along the second direction, and the second incident angle $\theta_{I-2}$ is defined depending on the positions of Q pixels along the fourth direction. By one time of emission of the light beam from the light source 11, one pixel in the display image is obtained finally. Therefore, P×Q times of emission of the light beam are required to display an image composed of P×Q pixels. The collimated light output from the second light deflector 50 is incident on the eyeball of the viewer and passes through the pupil (having a diameter of about 2 to 6 mm normally) in the eyeball. Then the collimated light is imaged on the retina and recognized as one pixel. By aggregation of this operation (P×Q times of emission of the light beam from the light source 11), a two-dimensional image composed of P×Q pixels for one frame can be recognized.

Figure 2A:
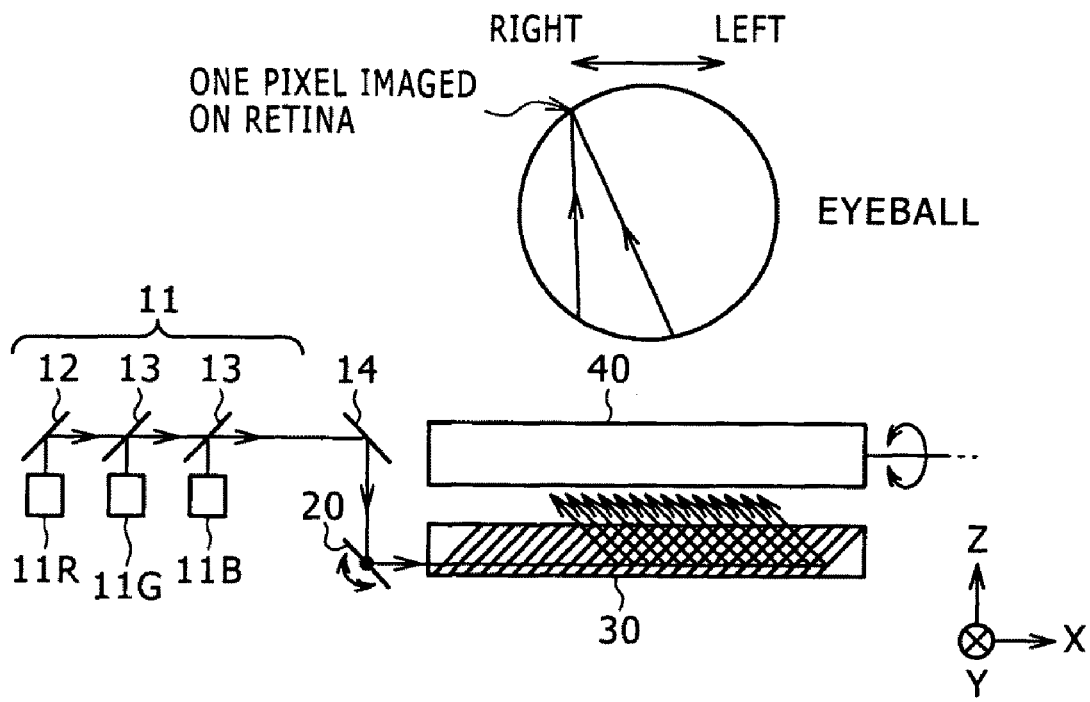
FIGS. 2A and 2B are diagrams schematically showing the state of a light beam and collimated light when the pixel at the lower left corner of an image is imaged on the upper right side of the retina in viewing of the image by the viewer.
Figure 2B:
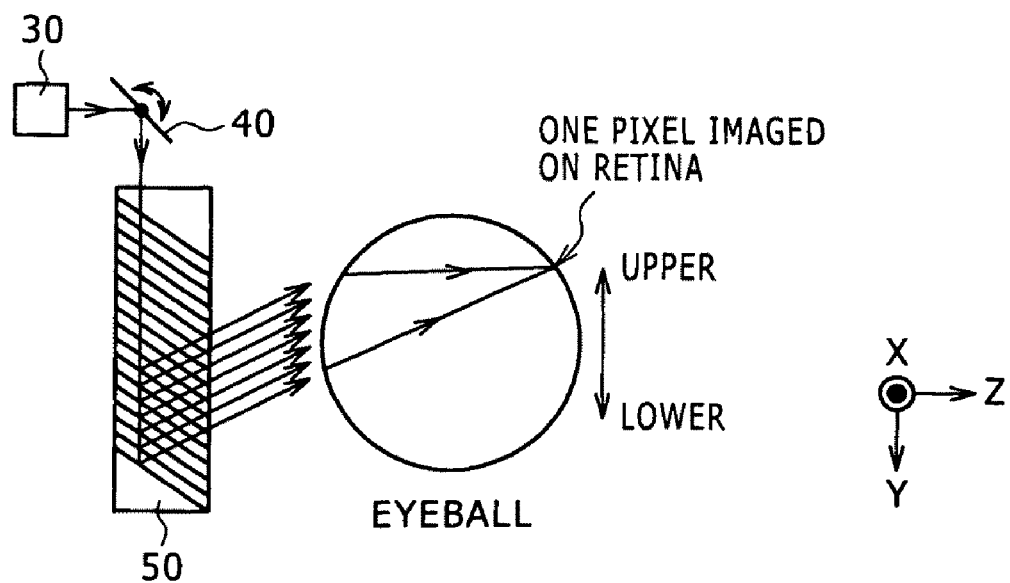
Figure 3A:
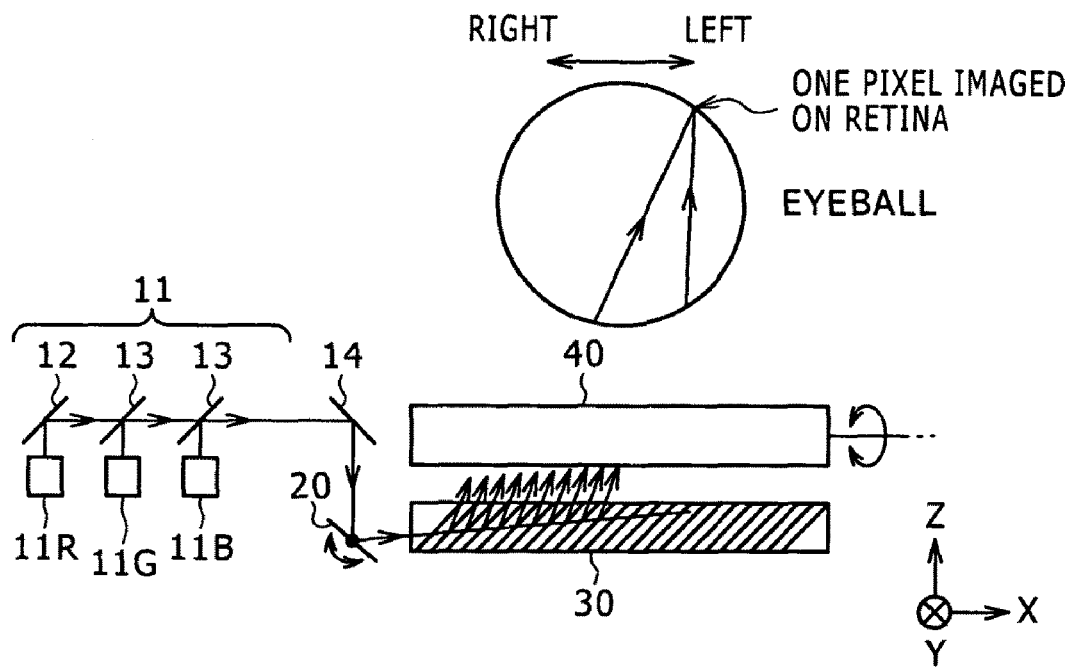
FIGS. 3A and 3B are diagrams schematically showing the state of a light beam and collimated light when the pixel at the lower right corner of an image is imaged on the upper left side of the retina in viewing of the image by the viewer.
Figure 3B:
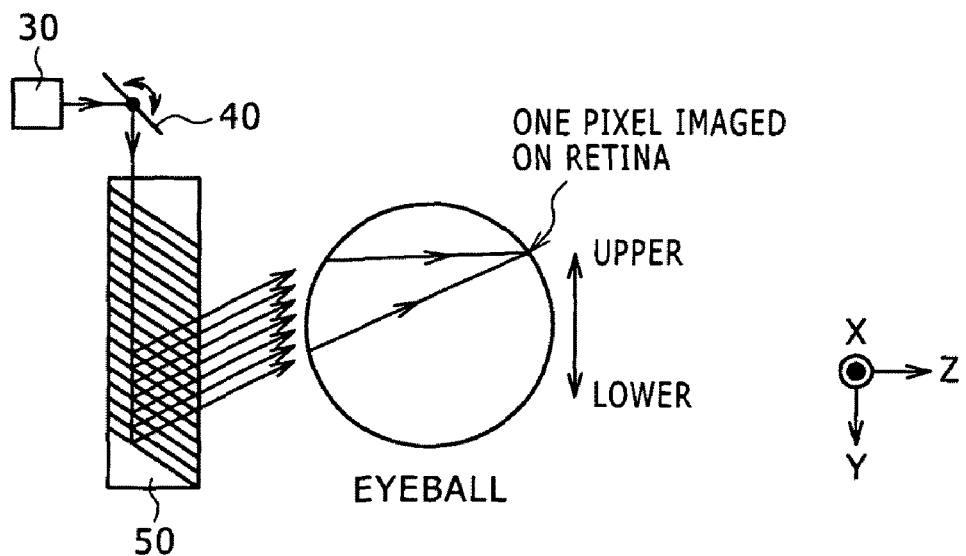
Figure 4A:
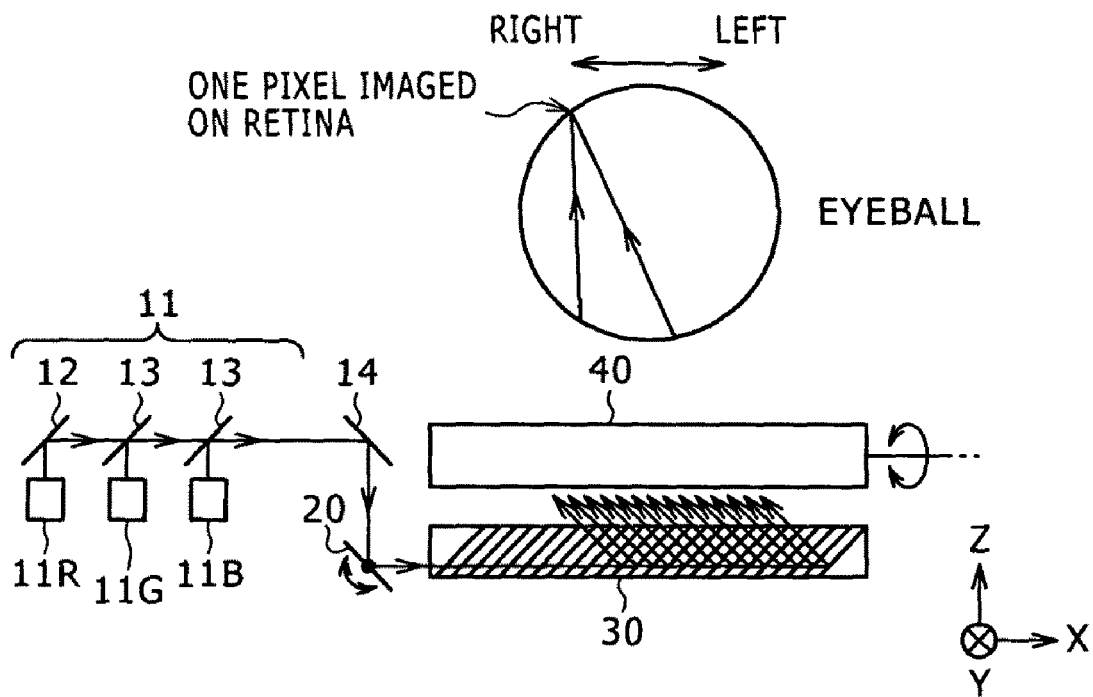
FIGS. 4A and 4B are diagrams schematically showing the state of a light beam and collimated light when the pixel at the upper left corner of an image is imaged on the lower right side of the retina in viewing of the image by the viewer.
Figure 4B:
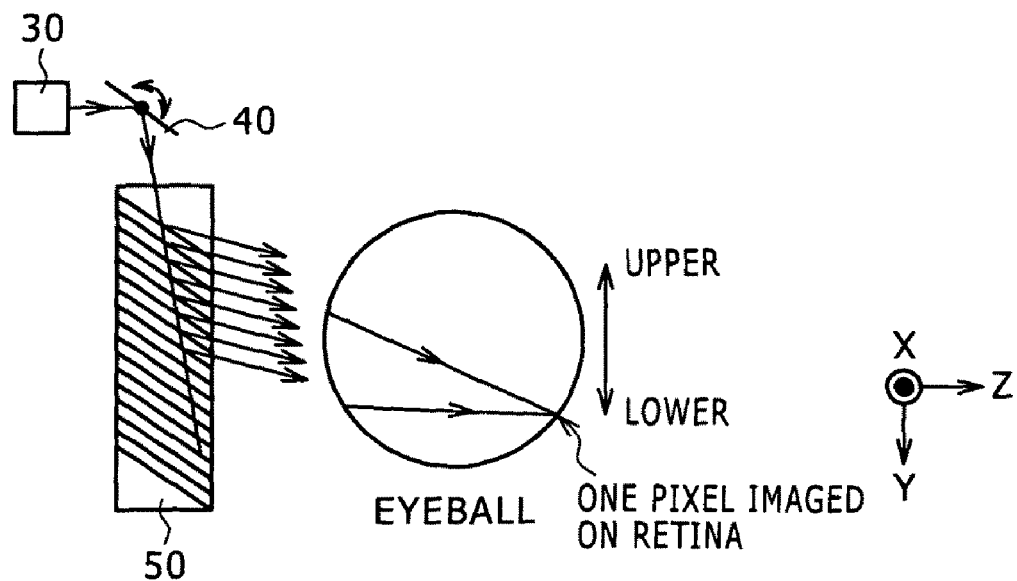
Figure 5A:
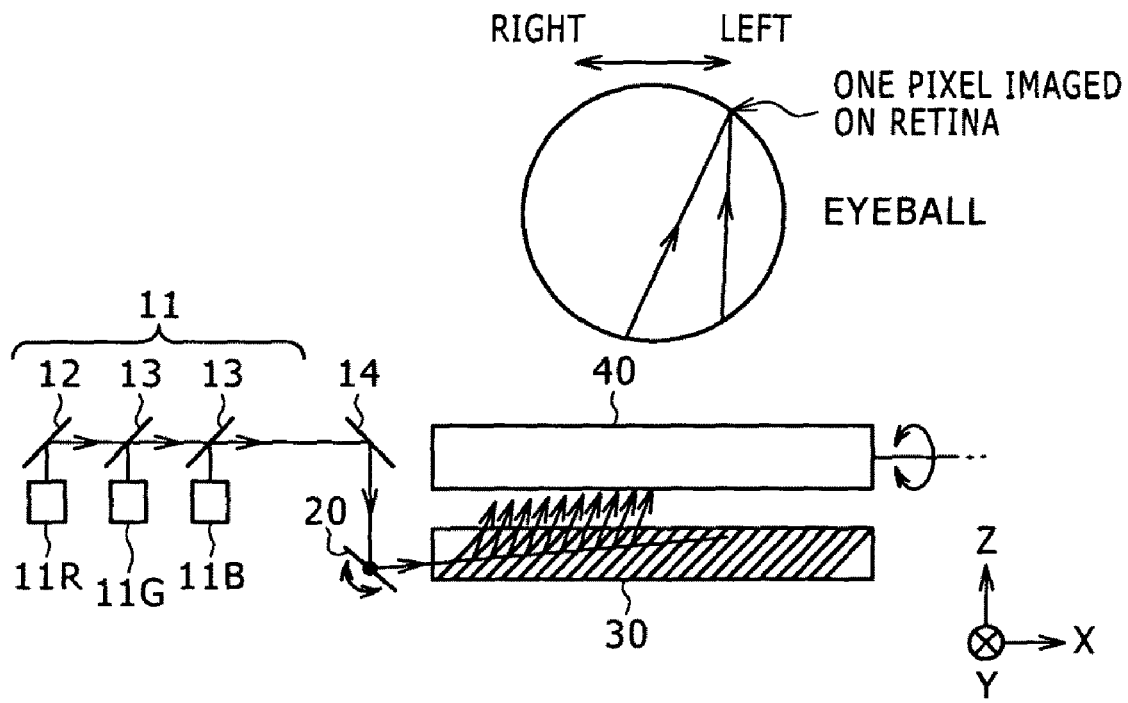
FIGS. 5A and 5B are diagrams schematically showing the state of a light beam and collimated light when the pixel at the upper right corner of an image is imaged on the lower left side of the retina in viewing of the image by the viewer.
Figure 5B:
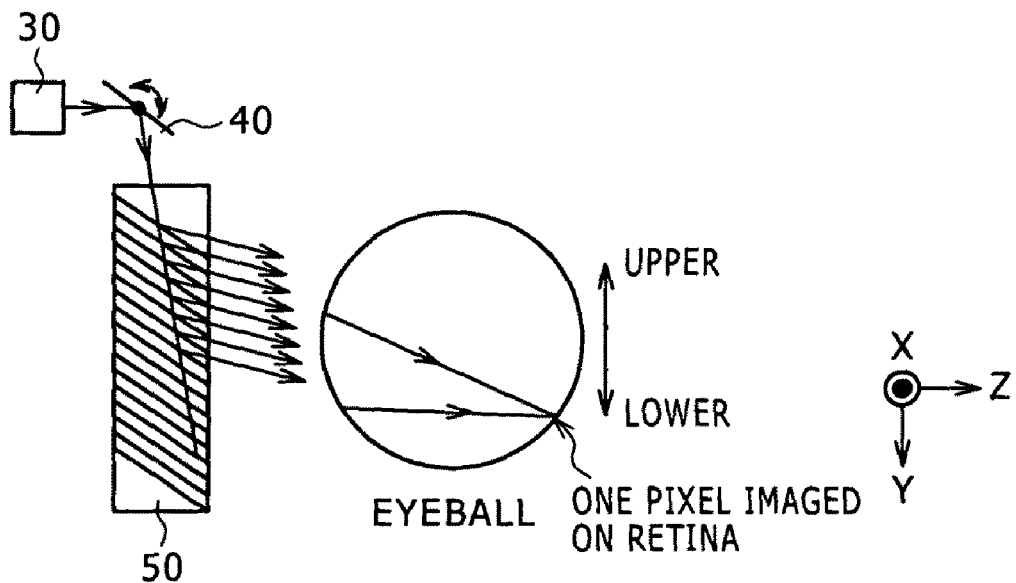

In the state shown in FIGS. 2A and 2B ("state-A"), when the viewer views the image, the pixel at the lower left corner of the image is imaged on the upper right side of the retina. In the state shown in FIGS. 3A and 3B ("state-B"), the pixel at the lower right corner of the image is imaged on the upper left side of the retina when the viewer views the image. In the state shown in FIGS. 4A and 4B ("state-C"), the pixel at the upper left corner of the image is imaged on the lower right side of the retina when the viewer views the image. In the state shown in FIGS. 5A and 5B ("state-D"), the pixel at the upper right corner of the image is imaged on the lower left side of the retina when the viewer views the image. The values of the first incident angle $\theta_{I-1}$, the first output angle $\theta_{O-1}$, the second incident angle $\theta_{I-2}$, and the second output angle $\theta_{O-2}$ in these states are shown in Table 1 made below.

TABLE 1

| | State-A | State-B | State-C | State-D |
|---|---|---|---|---|
| First incident angle $\theta_{I-1}$ | minimum value | maximum value | minimum value | maximum value |
| First output angle $\theta_{O-1}$ | minimum value | maximum value | minimum value | maximum value |
| Second incident angle $\theta_{I-2}$ | minimum value | minimum value | maximum value | maximum value |
| Second output angle $\theta_{O-2}$ | minimum value | minimum value | maximum value | maximum value |

The light beam incident on the first light deflector 30 is expanded in the second direction by the first light deflector 30, and the collimated light incident on the second light deflector 50 is expanded in the fourth direction by the second light deflector 50. Thereby, the collimated light finally obtained results from two-dimensional expansion in the second direction and the fourth direction.

The first mirror 20 and the second mirror 40 are formed of e.g. MEMS having a micromirror that is pivotable about one axis. As such a micromirror based on MEMS, one having known configuration and structure can be employed. Therefore, detailed description thereof is omitted. The number of times of pivoting of the first mirror 20 per unit time (vibrational frequency) is larger than the number of times of pivoting of the second mirror 40 per unit time (vibrational frequency). Specifically, for example, the number of times of pivoting of the first mirror 20 per unit time is set to 21 kHz, and the number of times of pivoting of the second mirror 40 per unit time is set to 60 Hz, which is the same as the frame rate. The high-speed pivoting of the first mirror 20 is performed based on resonance, and the low-speed pivoting of the second mirror 40 is performed not based on resonance. Alternatively, the pivoting of both mirrors may be performed based on resonant driving. The area of the second mirror 40 is larger than that of the first mirror 20 because the light beam is expanded in the second direction by the first light deflector 30. Specifically, for example, the first mirror 20 is a rectangle whose side along the first direction has a length of 2.0 mm and whose side along a direction perpendicular to the first direction has a length of 2.8 mm. The second mirror 40 is a rectangle whose side along the third direction has a length of 30 mm and whose side along a direction perpendicular to the third direction has a length of 2.8 mm.

In embodiment example 1, the first direction and the fourth direction correspond with each other (are parallel to each other), and the second direction and the third direction correspond with each other (are parallel to each other). In addition, the first direction and the fourth direction are perpendicular to the second direction and the third direction. Furthermore, the image viewing position is located in the fifth direction from the viewpoint of the second light deflector 50, and the fifth direction is perpendicular to the first direction and the fourth direction and perpendicular to the second direction and the third direction. More specifically, the second direction and the third direction are defined as the X direction, the first direction and the fourth direction are defined as the Y direction, and the fifth direction is defined as the Z direction. However, the definition of the directions is not limited thereto, and the respective directions do not need to be in the parallel and perpendicular relationship.

The first light deflector 30 and the second light deflector 50 are fabricated by using optical glass (BK7, with a refractive index of 1.5168 [wavelength 587.6 nm]). For example, as the dimensions of the first light deflector 30, the length (length along the second direction) is 30 mm, the height (length along the fourth direction) is 3.0 mm, and the thickness (length along the fifth direction) is 7.0 mm. As the dimensions of the second light deflector 50, the length (length along the second direction) is 30 mm, the height (length along the fourth direction) is 30 mm, and the thickness (length along the fifth direction) is 5.0 mm. Plural semi-transmissive mirrors are provided inside the first light deflector 30, and plural semi-transmissive mirrors are provided also inside the second light deflector 50. In embodiment example 1, the semi-transmissive mirrors (light reflective/transmissive films 31 and 51) are formed of a dielectric multi-layer film. The light reflectance of the light reflective/transmissive films 31 and 51 is about 5% in perpendicular incidence when the wavelength is 532 nm. A large number of light reflective/transmissive films 31 and 51 are formed in the first light deflector 30 and the second light deflector 50, and the pitch of the light reflective/transmissive films 31 and 51 along the second direction and the fourth direction is 0.75 mm for example. The light reflective/transmissive films 31 and 51 are formed with an equal pitch. The angle of the light reflective/transmissive film 31 with respect to the second direction (angle formed with the second direction) in the first light deflector 30 is the same in all of the light reflective/transmissive films 31, and is 49 degrees. Similarly, the angle of the light reflective/transmissive film 51 with respect to the fourth direction (angle formed with the fourth direction) in the second light deflector 50 is the same in all of the light reflective/transmissive films 51, and is 47.5 degrees.

The first light deflector 30 and the second light deflector 50 can be fabricated as follows. Specifically, the light reflective/transmissive films 31 and 51 are formed on surfaces of optical glass having a predetermined thickness based on an EB evaporation method, and the materials thus obtained are bonded to each other to be stacked. Then cutting and polishing are so performed that the light reflective/transmissive films 31 and 51 form the predetermined angles with the second direction and the fourth direction.

In embodiment example 1, the light source 11 is formed of semiconductor laser elements (LD). Specifically, the light source 11 is formed of a light emitting element (semiconductor laser element) 11R for red light emission, a light emitting element (semiconductor laser element) 11G for green light emission, and a light emitting element (semiconductor laser element) 11B for blue light emission. Furthermore, the light source 11 includes a multiplexer (color synthesizer) that synthesizes red light beam, green light beam, and blue light beam emitted from these light emitting elements 11R, 11G, and 11B into one light beam. The multiplexer is formed of dichroic prisms 13 specifically. Reference numerals 12 and 14 denote reflective mirrors. A light beam shaper (collimating lens) for turning the light beam emitted from the light source 11 to a collimated light beam is disposed between the light source 11 and the fixed mirror 14, although not shown in the diagram. Furthermore, an aperture (not shown) for making the sectional shape of the light beam is provided between the light source 11 and the fixed mirror 14. The shape of the aperture is a circle having a diameter of 1.0 mm for example. In this case, when one light beam is incident on the first mirror 20, the sectional area of the light beam is $7.9 \times 10^{-3}$ cm².

FIGS. 6, 7, and 8 show the light intensity variation ratio obtained based on the result of simulation of light intensity variation in the pupil when the parameters were set to the following values: the diameter of the light beam was 1.0 mm, the pupil diameter was 2 mm, 3 mm, 4 mm, and 5 mm, the array pitch of the light beam (distance between the centers of adjacent light beams) was 1.0 times the diameter of the light beam (represented as "PITCH 1" in the diagrams), 1.1 times (represented as "PITCH 1.1" in the diagrams), 1.2 times (represented as "PITCH 1.2" in the diagrams), and 1.5 times (represented as "PITCH 1.5" in the diagrams). In addition, the light intensity distributions of the light beam obtained in this simulation are also shown in the diagrams. If the light intensity of the center of the light beam coming at the first mirror 20 is defined as $I_{max}$ and the light intensity of the light beam end is defined as $I_{min}$, the following relationships are obtained in the examples of FIGS. 6 to 8, respectively.

$I_{min}/I_{max}=0.135$ (FIG. 6)

$I_{min}/I_{max}=0.411$ (FIG. 7)

$I_{min}/I_{max}=0.607$ (FIG. 8)

From the diagrams, it turns out that change in the light intensity variation ratio becomes smaller as the value of $I_{min}/I_{max}$ becomes larger. That is, for example, change in the light intensity of the image viewed by the viewer occurs less readily even when the position of the pupil of the viewer moves relative to the second light deflector 50. Therefore, it is preferable that the light source, the collimating lens, and the aperture be so designed that a large value of $I_{min}/I_{max}$ is obtained. Furthermore, in order to further reduce the light intensity variation, the array pitch of the light reflective/transmissive films may be so designed that the array pitch of the light beam becomes equal to or shorter than 1.0 times the diameter of the light beam.

The image display device and the light beam expanding device of embodiment example 1 include the first mirror 20, the first light deflector 30, the second mirror 40, and the second light deflector 50, and turn the light beam emitted from the light source 11 to collimated light to output the collimated light. Therefore, for example a two-dimensional image does not need to be created as an intermediate image inside the scanner and the light beam expanding device. Furthermore, the image forming device itself, which is formed of e.g. a liquid crystal display device, is unnecessary. Consequently, reduction in the sizes of the light source and the scanner and reduction in the size and weight as the whole of the image display device can be achieved. In addition, for example, the incidence of collimated light on the second light deflector is asymmetric in the X direction and thus a ghost hardly overlaps with the image itself.

An anti-reflection coating may be provided on a light beam incident surface 32, and a collimated light output surface 33 of the first light deflector 30, and the anti-reflection coating may be provided on each of a collimated light incident surface 52, a collimated light output surface 53, and a surface 54 opposed to the collimated light output surface 53, of the second light deflector 50. The anti-reflection coating (ARC) is formed by using e.g. $MgF_X$.

A half-wave plate designed to match a wavelength of 532 nm may be attached to the collimated light output surface 33 of the first light deflector 30. By this half-wave plate, polarized light of the collimated light output from the collimated light output surface 33 of the first light deflector 30 is rotated by 90°, so that the same reflectance as the designed value is obtained also in the light reflective/transmissive film 51 of the second light deflector 50.

Figure 9A:
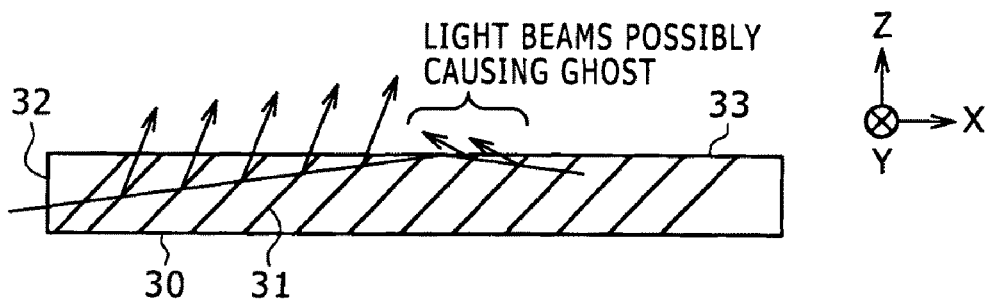
FIG. 9A is a diagram schematically showing the state when a light beam incident on a first light deflector from a first mirror is totally reflected by a collimated light output surface of the first light deflector.

If the light beam incident on the first light deflector 30 from the first mirror 20 is totally reflected by the collimated light output surface 33 of the first light deflector 30, as shown in a schematic sectional view of FIG. 9A, the totally reflected light is reflected by the light reflective/transmissive films 31 and then output from the first light deflector 30 and consequently a ghost possibly occurs depending on the case. Therefore, to suppress the occurrence of such a ghost, the light transmittance of the light reflective/transmissive film 31 at the ghost occurrence part in the first light deflector 30 is optimized, and the first light deflector 30 is so designed that the generated ghost is prevented from entering the pupil of the viewer. This applies also to the second light deflector 50.

Figure 9B:
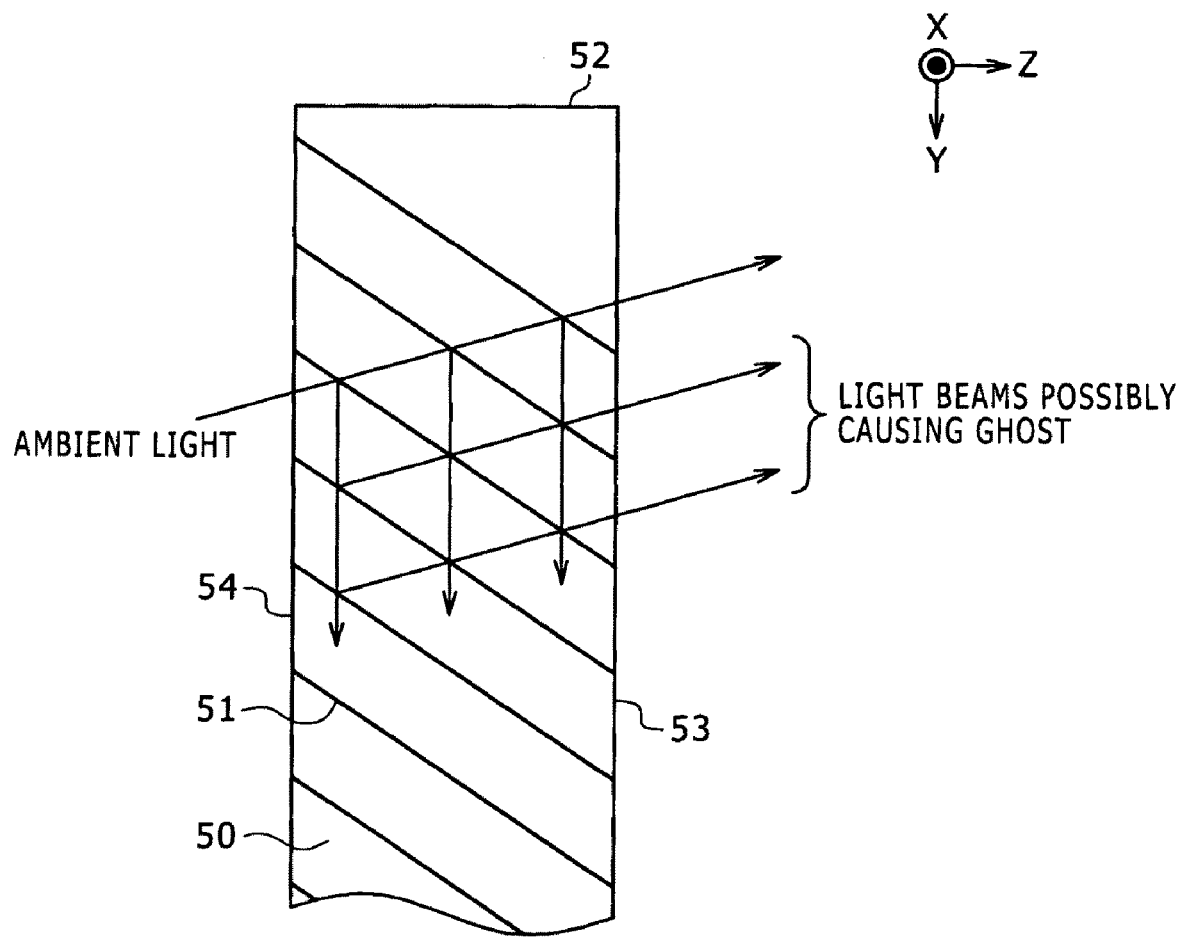
FIG. 9B is a diagram schematically showing the state when ambient light incident on a second light deflector through the surface opposed to a collimated light output surface of the second light deflector collides with light reflective/transmissive films and consequently a ghost occurs.

Furthermore, as shown in a schematic partial sectional view of FIG. 9B, if ambient light incident through the surface 54 opposed to the collimated light output surface 53 of the second light deflector 50 collides with the light reflective/transmissive films 51, part of the ambient light is reflected and the reflected ambient light collides with other light reflective/transmissive films 51, the collimated light output surface 53, and the surface 54 opposed to the collimated light output surface 53 to repeat reflection and passage. As a result, a ghost possibly occurs. In such a case, to suppress the occurrence of a ghost as much as possible, the light transmittance of the light reflective/transmissive films 51 is set as high as possible. Alternatively, as another method, a polarizer may be attached to the surface 54 opposed to the collimated light output surface 53 of the second light deflector 50. This method can suppress the reflection of the incident ambient light by the light reflective/transmissive films 51 and thus can prevent the occurrence of a ghost.

[Embodiment Example 2]

Embodiment example 2 is a modification of embodiment example 1. As described above, if the light intensity of the branched light beam, which is output from the first light deflector 30 or the second light deflector 50 after being reflected plural times (e.g. three times) by the semi-transmissive mirror (light reflective/transmissive film 31 or 51) provided inside the first light deflector 30 or the second light deflector 50, is so high as to be unignorable with respect to the light intensity of the main light beam, which is output from the first light deflector 30 or the second light deflector 50 after being reflected one time, streak patches (unevenness) arise in the image attributed to the interference between the main light beam and the branched light beam in some cases (see FIG. 15).

In embodiment example 2, to prevent the arising of such streak patches, variation $b_1$ in the design value $B_{1d}$ of the pitch of the plural semi-transmissive mirrors (light reflective/transmissive films 31) provided inside the first light deflector 30 along the second direction satisfies the following expression (2-1) if the peak wavelength of the emission spectrum of the light source is defined as $\lambda$ and the spectrum half-value width is defined as $\Delta\lambda$.

$$b_1 \geq \lambda^2/(3\pi\Delta\lambda) \qquad (2\text{-}1)$$

In other words, the pitch of the plural semi-transmissive mirrors along the second direction is so varied as to satisfy expression (2-1).

Figure 10A:
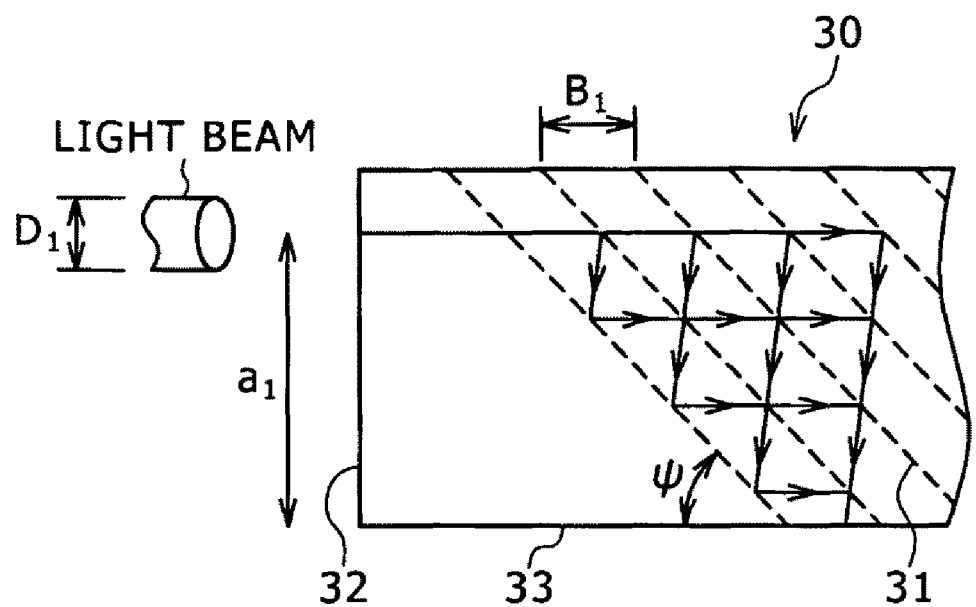
FIGS. 10A and 10B are schematic partial sectional views of first light deflectors in embodiment example 2 and embodiment example 3, respectively.

As shown in FIG. 10A, which is a schematic partial sectional view of the first light deflector 30, the design value $B_{1d}$ of the pitch was set to 0.70 mm, and the diameter $D_1$ of the light beam incident on the first light deflector 30 was set to 1.5 mm. In addition, the inclination angle (angle formed with the second direction) $\psi$ of the semi-transmissive mirror (light reflective/transmissive film 31) was set to 49 degrees, and the number of light reflective/transmissive films 31 was set to 30. Under this condition, a large number of simulations were performed with various changes in the variation $b_1$ in the pitch along the second direction. As a result, the maximum variation in the optical path length was about three times the variation $b_1$ in the pitch. The value of the distance $(a_1)$ between the position of the incidence of the light beam on the first light deflector 30 and the collimated light output surface 33 of the first light deflector 30 is larger than the diameter $D_1$ of the light beam incident on the first light deflector 30. Similarly, the value of the distance between the position of the incidence of the light beam on the second light deflector 50 and the collimated light output surface 53 of the second light deflector 50 (q.v. $a_1$) is larger than the diameter of the light beam incident on the second light deflector 50 (q.v. $D_1$).

On the other hand, the coherence length $L_c$ can be represented by the following expression (2-2).

$$L_c = \lambda^2/(\pi\Delta\lambda) \qquad (2\text{-}2)$$

If the variation in the optical path length is equal to or larger than the coherence length $L_c$, the occurrence of the interference can be suppressed. Thus, the following expression (2-3) holds.

$$3b_1 \geq \lambda^2/(\pi\Delta\lambda) \qquad (2\text{-}3)$$

From expression (2-3), expression (2-1) can be derived.

As described above, for example the first light deflector 30 is obtained by forming the light reflective/transmissive films 31 on surfaces of optical glass having a predetermined thickness based on an EB evaporation method and bonding the materials thus obtained to each other to stack them. In this case, as the method for varying the pitch of the plural semi-transmissive mirrors (light reflective/transmissive films 31) along the second direction, a method of changing the thickness of the optical glass in forming the first light deflector 30 can be employed. Alternatively, a method of changing the thickness of the adhesive used in bonding and stacking the materials or a method of using adhesives to which fillers having different particle diameters are added can be employed.

In the case of the semi-transmissive mirrors (light reflective/transmissive films 31) whose pitch is given the variation $b_1 = 20$ μm, the maximum variation in the optical path length is about 60 μm. Therefore, if $\lambda$ is 532 nm, the minimum $\Delta\lambda$ satisfying expression (2-1) is about 1.5 nm.

Similar setting can be employed also regarding the plural semi-transmissive mirrors (light reflective/transmissive films 51) provided inside the second light deflector 50. Specifically, variation $b_2$ in the design value $B_{2d}$ of the pitch of the plural semi-transmissive mirrors or the like provided inside the second light deflector 50 along the fourth direction satisfies the following expression (2-4) if the peak wavelength of the emission spectrum of the light source is defined as $\lambda$ and the spectrum half-value width is defined as $\Delta\lambda$.

$$b_2 \geq \lambda^2/(3\pi\Delta\lambda) \qquad (2\text{-}4)$$

In these cases, it is desirable that the light reflectance of the semi-transmissive mirrors or the like provided inside the first light deflector 30 and the second light deflector 50 be equal to or lower than 10%, preferably equal to or lower than 5%, in perpendicular incidence.

The light source in which the peak wavelength $\lambda$ of the emission spectrum was 532 nm and the spectrum half-value width $\Delta\lambda$ was 1.5 nm was used, and the first light deflector 30 and the second light deflector 50 including the semi-transmissive mirrors (light reflective/transmissive films 31 and 51) whose pitches were given the variations $b_1$ and $b_2$ of 20 μm was used. As a result, an optical path difference was generated between the light beams and the interference between the main light beam and the branched light beam occurred less readily, so that the arising of streak patches in the image could be suppressed.

[Embodiment Example 3]

Embodiment example 3 is also a modification of embodiment example 1. As described above, in the case of the semi-transmissive mirrors (light reflective/transmissive films 31 or 51) provided inside the first light deflector 30 or the second light deflector 50, a light beam reflected by a certain semi-transmissive mirror or the like and e.g. a light beam reflected by a semi-transmissive mirror or the like adjacent to this semi-transmissive mirror or the like interfere with each other, and dot patches arise in some cases (see FIG. 16). This phenomenon possibly occurs when the light beams reflected by adjacent semi-transmissive mirrors or the like overlap with each other (or when the diameter $D_1$, $D_2$ of the light beam is substantially larger than the pitch $B_1$, $B_2$ of the provided semi-transmissive mirrors or the like).

Figure 10B:
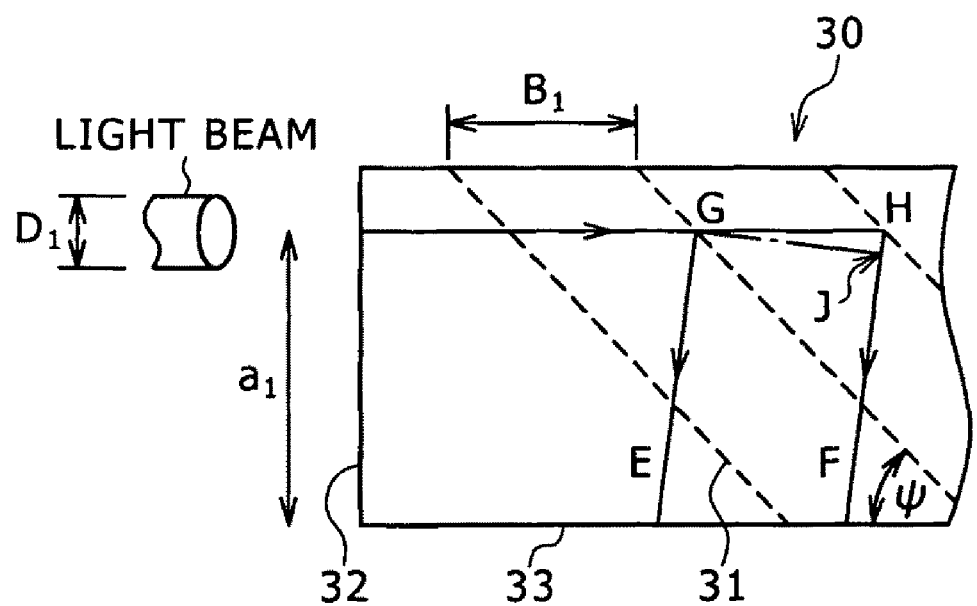

As shown in FIG. 10B, which is a schematic partial sectional view of the first light deflector 30, the optical path difference between a light beam "E" reflected by a certain semi-transmissive mirror and a light beam "F" reflected by a semi-transmissive mirror adjacent to this semi-transmissive mirror is equal to the total length of a segment GH and a segment HJ. This total length is at most twice the pitch $B_1$. As a result of the interference between the light beam "E" and the light beam "F," patches arise in the image. The interference possibly occurs also between light beams reflected by semi-transmissive mirrors that are not adjacent to each other. In the first light deflector 30, about 500 bright-dark dots arise if the horizontal angle of view is 20 degrees. Similarly, bright-dark dots arise also in the second light deflector 50. As a result, dot patches arises in the image. In addition, moire arises due to overlapping of such dot patches and the image in some cases.

To prevent the arising of the dot patches, the interference between the light beam "E" and the light beam "F" is suppressed. For this purpose, the optical path length (the total length of the segment GH and the segment HJ) is set longer than the coherence distance $L_c$. The coherence distance is obtained from expression (2-2). On the other hand, the maximum value of the optical path length (the total length of the segment GH and the segment HJ) is $2B_1$. Thus, when the optical path length is approximately set to $2B_1$, the interference between the light beam "E" and the light beam "F" can be suppressed if the following expression (3-1) is satisfied.

$$B_1 > \lambda^2/(2\pi\Delta\lambda) \quad (3\text{-}1)$$

In addition, the following expression (3-2) holds.

$$D_1 > B_1 \quad (3\text{-}2)$$

Similarly, regarding the second light deflector 50, the interference between the light beam "E" and the light beam "F" can be suppressed if the following expression (3-3) is satisfied.

$$B_2 > \lambda^2/(2\pi\Delta\lambda) \quad (3\text{-}3)$$

In addition, the following expression (3-4) holds.

$$D_2 > B_2 \quad (3\text{-}4)$$

In these cases, it is desirable that the light reflectance of the semi-transmissive mirrors provided inside the first light deflector 30 and the second light deflector 50 be equal to or lower than 10%, preferably equal to or lower than 5%, in perpendicular incidence.

If $\lambda$ is 532 nm and $B_1$ and $B_2$ are 0.70 mm similarly to embodiment example 2, the minimum satisfying expressions (3-1) and (3-3) is about 0.064 nm.

The light source in which the peak wavelength $\lambda$ of the emission spectrum was 532 nm and the spectrum half-value width $\Delta\lambda$ was 1.5 nm was used, and the first light deflector 30 and the second light deflector 50 including the semi-transmissive mirrors whose pitches $B_1$ and $B_2$ were 0.70 mm was used. As a result, an optical path difference was generated between the light beams and the interference between the light beams reflected by adjacent semi-transmissive mirrors occurred less readily, so that the arising of dot patches in the image could be suppressed. Furthermore, this condition is the same as that described for embodiment example 2. Therefore, based on this condition, the arising of streak patches and dot patches in the image can be suppressed.

[Embodiment Example 4]

Figure 11:
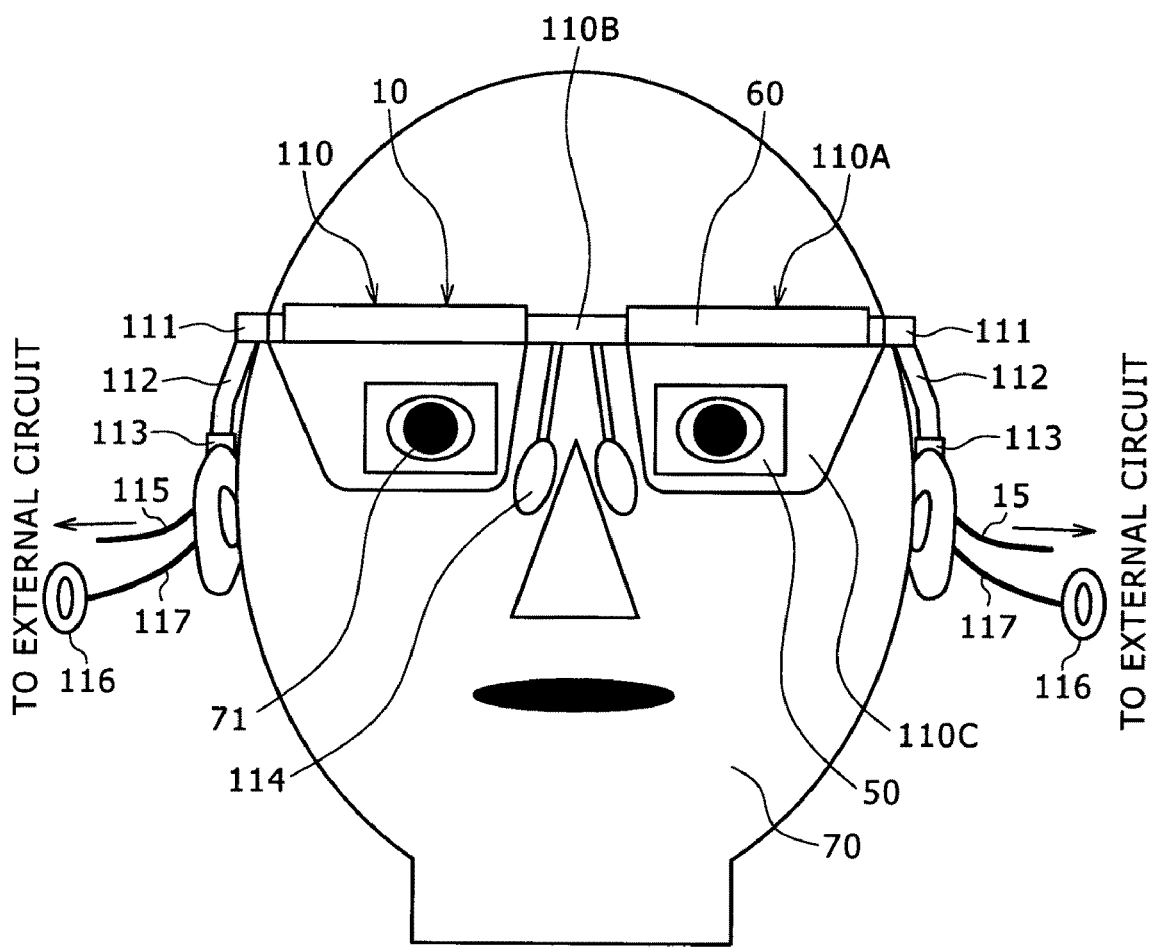
FIG. 11 is a schematic diagram obtained when a head-mounted display of embodiment example 4 is viewed from the front side.
Figure 12:
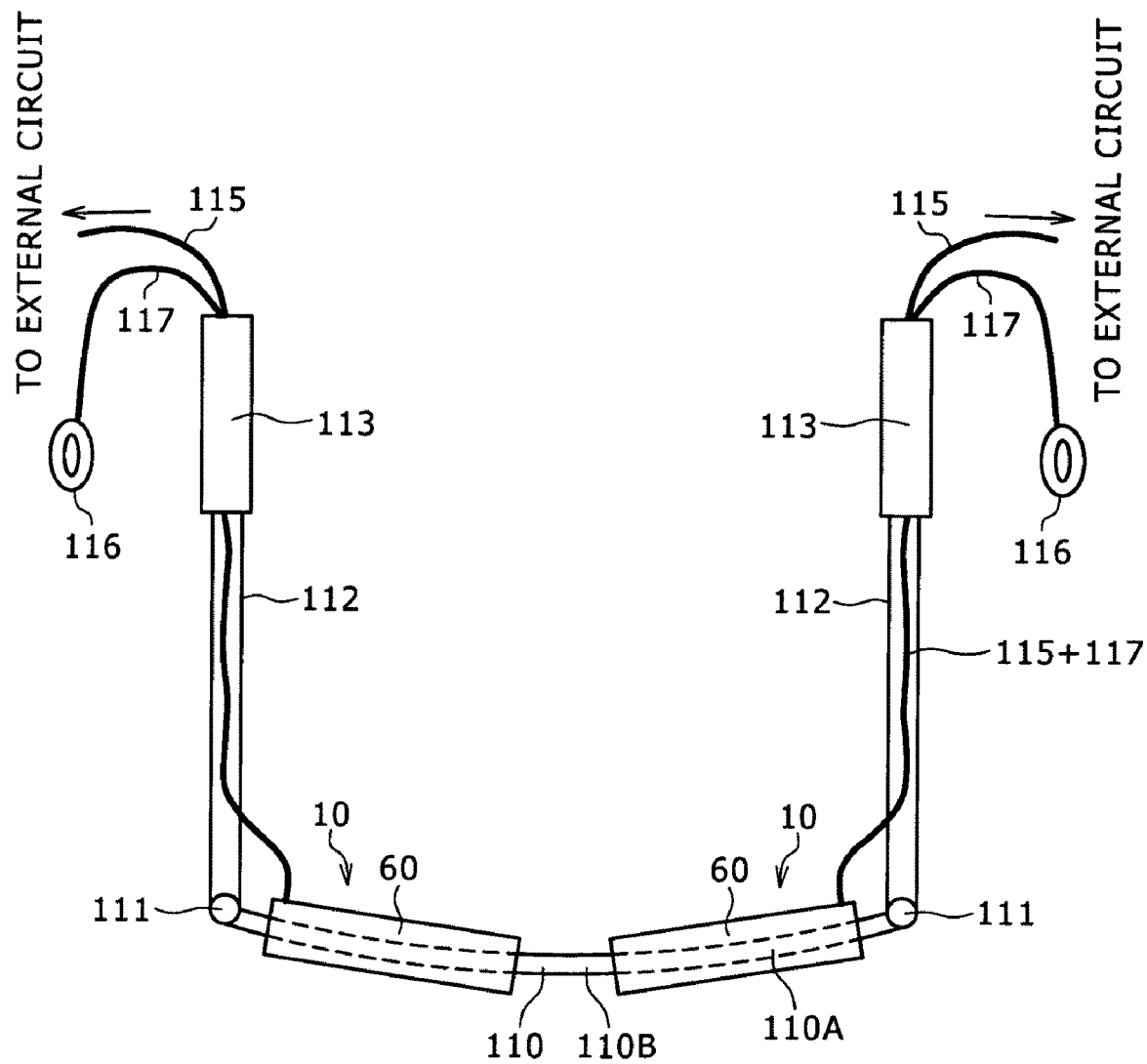
FIG. 12 is a schematic diagram obtained when the head-mounted display of embodiment example 4 is viewed from above.

Embodiment example 4 relates to a head-mounted display (HMD) in which the image display device of the present invention, specifically the image display device 10 described for embodiment example 1, is incorporated. FIG. 11 is a schematic diagram obtained when the head-mounted display of embodiment example 4 is viewed from the front side. FIG. 12 is a schematic diagram obtained when the head-mounted display of embodiment example 4 is viewed from above.

The head-mounted display of embodiment example 4 includes (A) an eyeglasses frame 110 mounted on the head of a viewer 70, and (B) the image display device 10.

The head-mounted display in embodiment example 4 is a display including two image display devices 10, i.e. a display for both eyes.

In the head-mounted display of embodiment example 4, a frame 110 is composed of a front part 110A disposed in front of the viewer 70, two temple parts 112 pivotably attached to both ends of the front part 110A with the intermediary of hinges 111, and end parts (referred to also as tip parts, earmuffs, and ear pads) 113 attached to the tips of the respective temple parts 112. At the upper part of the front part 110A, the light source 11, the first mirror 20, the first light deflector 30, and the second mirror 40 are disposed. The second light deflector 50 is so disposed as to be opposed to a pupil 71 of the viewer 70. Specifically, the second light deflector 50 is attached to an attachment member 110C formed of a transparent glass plate disposed at the position equivalent to the lens-attached position in the frame of normal eyeglasses. The light source 11, the first mirror 20, the first light deflector 30, and the second mirror 40 are housed in a case 60 and are not shown in FIG. 11 and FIG. 12. A nose pad 114 is attached to the front part 110A. Diagrammatic representation of the nose pad 114 is omitted in FIG. 12. The frame 110 is fabricated by using a metal or plastic.

Furthermore, interconnects (signal lines, power supply lines, and so forth) 115 leading out of the image display devices 10 pass through the inside of the temple parts 112 and the end parts 113 and are extended from the tips of the end parts 113 to the external to be connected to an external circuit (not shown). Furthermore, each image display device 10 is provided with a headphone 116, and a headphone interconnect 117 leading out of each image display device 10 passes through the inside of the temple part 112 and the end part 113 and is extended from the tip of the end part 113 to the headphone 116. More specifically, the headphone interconnect 117 is routed from the tip of the end part 113 to the headphone 116 via the backside of the ear auricle (auditory capsule). By employing such a configuration, a neat head-mounted display can be provided without giving the impression that the headphone 116 and the headphone interconnect 117 are messily disposed.

Figure 13:
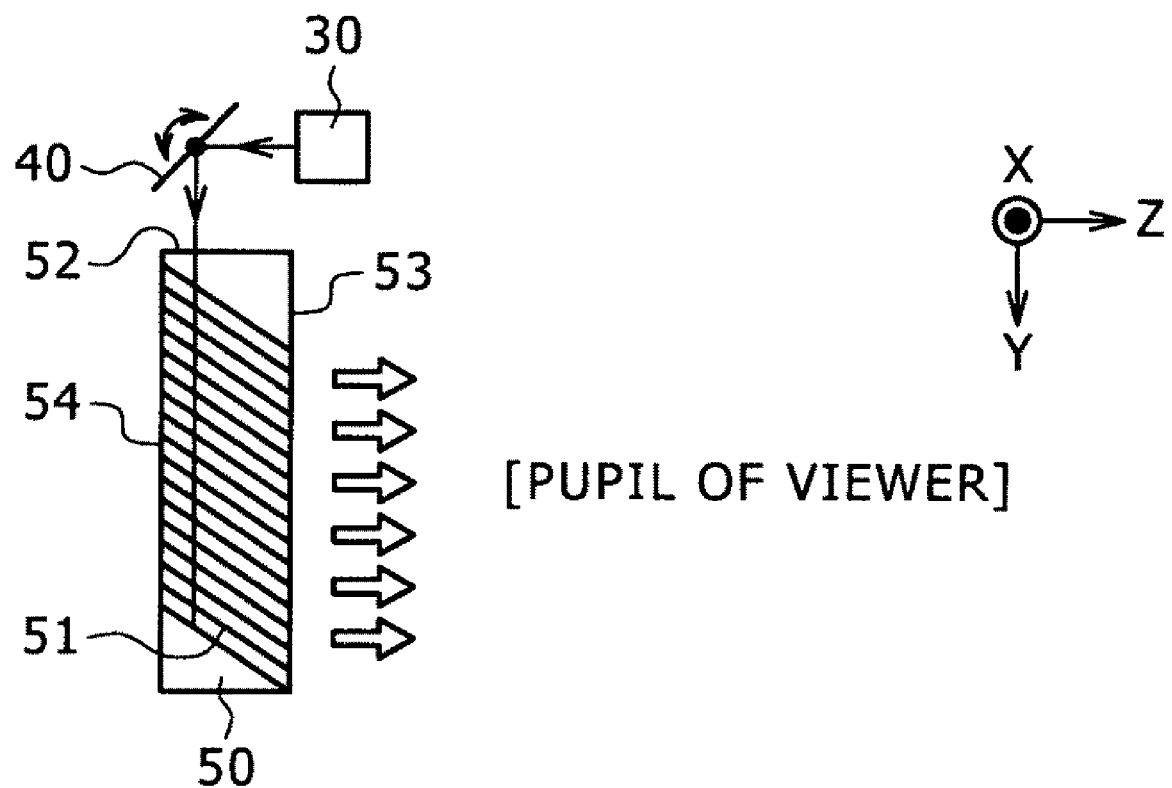
FIG. 13 is a conceptual diagram of a modification example of the image display device and the light beam expanding device of embodiment example 1.
Figure 14:
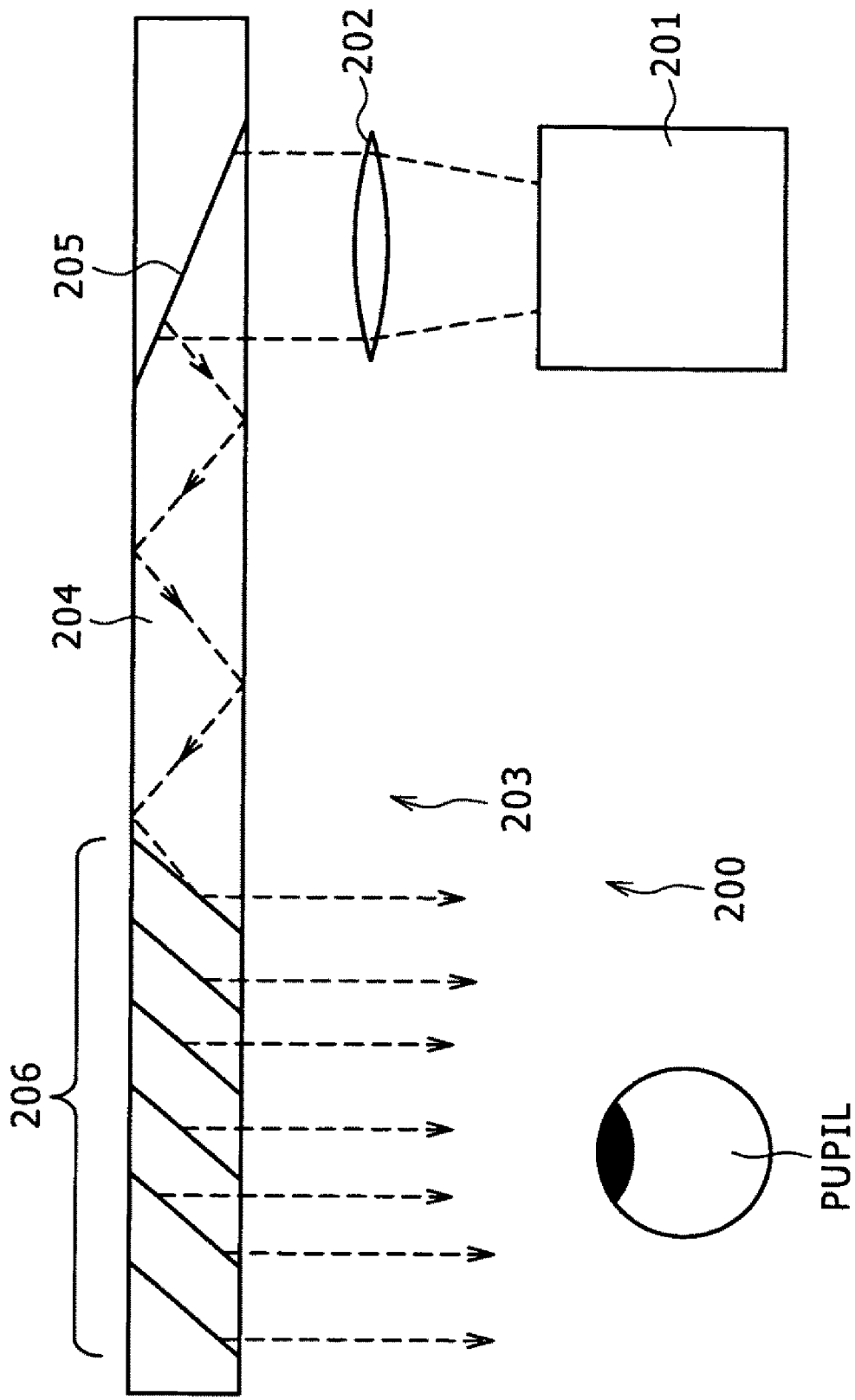
FIG. 14 is a conceptual diagram of an image display device of a related art.

Although the present invention has been described above based on preferred embodiment examples, the present invention is not limited to these embodiment examples. The configurations and structures of the image display device, the light beam expanding device, and the head-mounted display described for the embodiment examples are merely examples and can be arbitrarily changed. Although only the display for both eyes, including two image display devices, is shown as the head-mounted display in the embodiment example, the head-mounted display may be a display for a single eye, including only one image display device. Furthermore, it is also possible to employ a configuration in which the light source is disposed in the temple part, and it is also possible to employ a configuration in which the first mirror, the first light deflector, the second mirror, and the second light deflector are disposed at the upper part of the front part. In the embodiment examples, a large number of light reflective/transmissive films are made to have the same light transmittance. However, the light transmittance may be changed depending on the position of the light reflective/transmissive film in the first light deflector or the second light deflector. Specifically, in the first light deflector, the light reflectance of the light reflective/transmissive film at a position remoter from the first mirror is set higher. In the second light deflector, the light reflectance of the light reflective/transmissive film at a position remoter from the second mirror is set higher. In other words, in the first light deflector, the light transmittance of the light reflective/transmissive film at a position remoter from the first mirror is set lower. In the second light deflector, the light transmittance of the light reflective/transmissive film at a position remoter from the second mirror is set lower. More specifically, for example, the value of the light reflectance of the light reflective/transmissive film at the position remotest from the first mirror or the second mirror is set 1.1 to 5 times the value of the light reflectance of the light reflective/transmissive film at the position adjacent to the first mirror or the second mirror. The embodiment examples are described by taking as an example such a unit arrangement that light is output from the first light deflector 30 in the positive Z-axis direction and then output from the second mirror 40 in the positive Y-axis direction (i.e. in the downward direction). However, the present invention is not limited to such a unit arrangement. As shown in FIG. 13, which is a conceptual diagram similar to FIG. 1B, it is also possible to employ such a unit arrangement that light is output from the first light deflector 30 in the negative Z-axis direction and then output from the second mirror 40 in the positive Y-axis direction (i.e. in the downward direction).

The present application contains subject matter related to that disclosed in Japanese Priority Patent Application JP 2009-169262 filed in the Japan Patent Office on Jul. 17, 2009, and Japanese Priority Patent Application JP 2010-103950 filed in the Japan Patent Office on Apr. 28, 2010, the entire contents of which are hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An image display device including a light source and scanning means for scanning of a light beam emitted from the light source, the scanning means comprising:
   (a) a first mirror configured to be pivotable about a first axis as a pivot axis extending along a first direction, the light beam emitted from the light source being incident on the first mirror;
   (b) first light deflecting means for having an axis line extending along a second direction different from the first direction, a light beam output from the first mirror being incident on the first light deflecting means at a first incident angle, the first light deflecting means outputting collimated light that forms a predetermined first output angle with the second direction depending on the first incident angle of the light beam in association with pivoting of the first mirror;
   (c) a second mirror configured to be pivotable about a second axis as a pivot axis extending along a third direction, the collimated light output from the first light deflecting means being incident on the second mirror; and
   (d) second light deflecting means for having an axis line extending along a fourth direction different from the third direction, collimated light output from the second mirror being incident on the second light deflecting means at a second incident angle, the second light deflecting means outputting collimated light that forms a predetermined second output angle with the fourth direction depending on the second incident angle of the collimated light in association with pivoting of the second mirror.

2. The image display device according to claim 1, wherein if the first output angle of the collimated light output from the first light deflecting means in such a direction as to get away from the first mirror is defined as an output angle of a positive value, the first output angle changes in a direction from a negative value to a positive value as the first incident angle of the light beam to the first light deflecting means becomes larger.

3. The image display device according to claim 2, wherein if the second output angle of the collimated light output from the second light deflecting means in such a direction as to get away from the second mirror is defined as an output angle of a positive value, the second output angle changes in a direction from a negative value to a positive value as the second incident angle of the collimated light to the second light deflecting means becomes larger.

4. The image display device according to claim 1, wherein the light beam incident on the first light deflecting means is expanded in the second direction by the first light deflecting means, and the collimated light incident on the second light deflecting means is expanded in the fourth direction by the second light deflecting means.

5. The image display device according to claim 1, wherein an image is formed by P×Q pixels that are so arranged that P pixels are arranged along the second direction and Q pixels are arranged along the fourth direction, and
the first incident angle is defined depending on positions of P pixels along the second direction and the second incident angle is defined depending on positions of Q pixels along the fourth direction.

6. The image display device according to claim 1, wherein the number of times of pivoting of the first mirror per unit time is larger than the number of times of pivoting of the second mirror per unit time.

7. The image display device according to claim 1, wherein the first direction and the fourth direction correspond with each other and the second direction and the third direction correspond with each other, and
the first direction and the fourth direction are perpendicular to the second direction and the third direction.

8. The image display device according to claim 1, wherein a plurality of semi-transmissive mirrors are provided inside the first light deflecting means, and
a plurality of semi-transmissive mirrors are provided inside the second light deflecting means.

9. The image display device according to claim 8, wherein variation $b_1$ in pitch of the plurality of semi-transmissive mirrors provided inside the first light deflecting means along the second direction satisfies a following expression $$b_1 \geq \lambda^2/(3\pi\Delta\lambda)$$

where $\lambda$ is peak wavelength of emission spectrum of the light source and $\Delta\lambda$ is spectrum half-value width.

10. The image display device according to claim 9, wherein light reflectance of the semi-transmissive mirrors provided inside the first light deflecting means is equal to or lower than 10% in perpendicular incidence.

11. The image display device according to claim 8, wherein variation $b_2$ in pitch of the plurality of semi-transmissive mirrors provided inside the second light deflecting means along the fourth direction satisfies a following expression $$b_2 \geq \lambda^2/(3\pi\Delta\lambda)$$

where $\lambda$ is peak wavelength of emission spectrum of the light source and $\Delta\lambda$ is spectrum half-value width.

12. The image display device according to claim 11, wherein
light reflectance of the semi-transmissive mirrors provided inside the second light deflecting means is equal to or lower than 10% in perpendicular incidence.

13. The image display device according to claim 8, wherein following expressions are satisfied $$D_1 > B_1$$

$$B_1 > \lambda^2/(2\pi\Delta\lambda)$$

where $D_1$ is diameter of the light beam incident on the first light deflecting means, $B_1$ is pitch of the plurality of semi-transmissive mirrors provided inside the first light deflecting means along the second direction, $\lambda$ is peak wavelength of emission spectrum of the light source, and $\Delta\lambda$ is spectrum half-value width.

14. The image display device according to claim 13, wherein
light reflectance of the semi-transmissive mirrors provided inside the first light deflecting means is equal to or lower than 10% in perpendicular incidence.

15. The image display device according to claim 8, wherein following expressions are satisfied $$D_2 > B_2$$

$$B_2 > \lambda^2/(2\pi\Delta\lambda)$$

where $D_2$ is diameter of the light beam incident on the second light deflecting means, $B_2$ is pitch of the plurality of semi-transmissive mirrors provided inside the second light deflecting means along the fourth direction, $\lambda$ is peak wavelength of emission spectrum of the light source, and $\Delta\lambda$ is spectrum half-value width.

16. The image display device according to claim 15, wherein
light reflectance of the semi-transmissive mirrors provided inside the second light deflecting means is equal to or lower than 10% in perpendicular incidence.

17. The image display device according to claim 1, wherein
an anti-reflection coating is provided on a light beam incident surface and a collimated light output surface of the first light deflecting means, and
an anti-reflection coating is provided on each of a collimated light incident surface, a collimated light output surface, and a surface opposed to the collimated light output surface, of the second light deflecting means.

18. A head-mounted display comprising:
(A) an eyeglasses frame configured to be mounted on a head of a viewer; and
(B) an image display device configured to be attached to the frame, wherein
the image display device includes a light source and scanning means for scanning of a light beam emitted from the light source, and
the scanning means includes
(a) a first mirror that is pivotable about a first axis as a pivot axis extending along a first direction, the light beam emitted from the light source being incident on the first mirror,
(b) first light deflecting means that has an axis line extending along a second direction different from the first direction, a light beam output from the first mirror being incident on the first light deflecting means at a first incident angle, the first light deflecting means outputting collimated light that forms a predetermined first output angle with the second direction depending on the first incident angle of the light beam in association with pivoting of the first mirror,
(c) a second mirror that is pivotable about a second axis as a pivot axis extending along a third direction, the collimated light output from the first light deflecting means being incident on the second mirror, and
(d) second light deflecting means that has an axis line extending along a fourth direction different from the third direction, collimated light output from the second mirror being incident on the second light deflecting means at a second incident angle, the second light deflecting means outputting collimated light that forms a predetermined second output angle with the fourth direction depending on the second incident angle of the collimated light in association with pivoting of the second mirror.

19. The head-mounted display according to claim 18, wherein
the frame is composed of a front part disposed in front of the viewer, two temple parts pivotably attached to both ends of the front part with intermediary of hinges, and end parts attached to tips of the temple parts,
the light source is disposed at an upper part of the temple part or the front part,
the first mirror, the first light deflecting means, and the second mirror are disposed at an upper part of the front part, and
the second light deflecting means is so disposed as to be opposed to a pupil of the viewer.

20. A light beam expanding device that two-dimensionally expands a light beam emitted from a light source in a second direction and a fourth direction and outputs the expanded light beam as collimated light, the light beam expanding device comprising:
(a) a first mirror configured to be pivotable about a first axis as a pivot axis extending along a first direction, the light beam emitted from the light source being incident on the first mirror;
(b) first light deflecting means for having an axis line extending along a second direction different from the first direction, a light beam output from the first mirror being incident on the first light deflecting means at a first incident angle, the first light deflecting means outputting collimated light that forms a predetermined first output angle with the second direction depending on the first incident angle of the light beam in association with pivoting of the first mirror;
(c) a second mirror configured to be pivotable about a second axis as a pivot axis extending along a third direction, the collimated light output from the first light deflecting means being incident on the second mirror; and
(d) second light deflecting means for having an axis line extending along a fourth direction different from the third direction, collimated light output from the second mirror being incident on the second light deflecting means at a second incident angle, the second light deflecting means outputting collimated light that forms a predetermined second output angle with the fourth direction depending on the second incident angle of the collimated light in association with pivoting of the second mirror.

21. An image display device including a light source and scanning means for scanning of a light beam emitted from the light source, the scanning means including:
(a) a first mirror configured to be pivotable about a first axis as a pivot axis extending along a first direction, the light beam emitted from the light source being incident on the first mirror;

(b) first light deflecting means on which a light beam output from the first mirror is incident at a first incident angle, the first light deflecting means outputting collimated light at an angle dependent on the first incident angle;

(c) a second mirror configured to be pivotable about a second axis as a pivot axis extending along a second direction different from the first direction, the collimated light output from the first light deflecting means being incident on the second mirror; and (d) second light deflecting means on which collimated light output from the second mirror is incident at a second incident angle, the second light deflecting means outputting collimated light at an angle dependent on the second incident angle.

22. The image display device according to claim 21, wherein the first direction is perpendicular to the second direction.

* * * * *